United States Patent
Sirotkin et al.

(10) Patent No.: US 10,327,143 B2
(45) Date of Patent: Jun. 18, 2019

(54) APPARATUS, SYSTEM AND METHOD OF COMMUNICATING BETWEEN A CELLULAR MANAGER AND A USER EQUIPMENT (UE) VIA A WLAN NODE

(71) Applicant: INTEL IP CORPORATION, Santa Clara, CA (US)

(72) Inventors: Alexander Sirotkin, Giv'on Hachadasha (IL); Nageen Himayat, Fremont, CA (US); Farid Adrangi, Lake Oswego, OR (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/746,865

(22) PCT Filed: Dec. 24, 2015

(86) PCT No.: PCT/US2015/000342
§ 371 (c)(1),
(2) Date: Jan. 23, 2018

(87) PCT Pub. No.: WO2017/018968
PCT Pub. Date: Feb. 2, 2017

(65) Prior Publication Data
US 2019/0124511 A1    Apr. 25, 2019

Related U.S. Application Data

(60) Provisional application No. 62/196,456, filed on Jul. 24, 2015.

(51) Int. Cl.
*H04L 12/46*     (2006.01)
*H04L 29/06*     (2006.01)
(Continued)

(52) U.S. Cl.
CPC ..... *H04W 12/0609* (2019.01); *H04L 12/4633* (2013.01); *H04L 63/164* (2013.01);
(Continued)

(58) Field of Classification Search
CPC . H04W 72/0446; H04W 76/12; H04W 12/02; H04W 76/15; H04W 84/12
See application file for complete search history.

(56) References Cited

U.S. PATENT DOCUMENTS

2007/0258427 A1* 11/2007 Shaheen ............... H04W 76/12
370/338
2009/0268675 A1* 10/2009 Choi ................. H04W 72/0453
370/329
(Continued)

FOREIGN PATENT DOCUMENTS

EP    2811779    12/2014

OTHER PUBLICATIONS

Alcatel-Lucent et al., 'Way forward on legacy WLAN support for LTE-WLAN Integration', RP-151047, 3GPP TSG-RAN WG Meeting #68, Malmo, Sweden, Jun. 15-18, 2015, 10 pages.
(Continued)

*Primary Examiner* — Diane D Mizrahi
(74) *Attorney, Agent, or Firm* — Shichrur & Co.

(57) ABSTRACT

Some demonstrative embodiments include devices, systems and/or methods of communicating between a cellular manager and a User Equipment (UE) via a Wireless Local Area network (WLAN) node. For example, an Evolved Node B (eNB) may be configured to communicate with a User Equipment (UE) traffic of at least one Evolved Universal Mobile Telecommunications System (UMTS) Terrestrial Radio Access Network (E-UTRAN) Radio Access Bearer (E-RAB); to participate in establishment of an IP tunnel with the UE via a Wireless Local Area Network (WLAN) node;
(Continued)

to encapsulate an IP payload comprising downlink traffic of the E-RAB in an IP tunneling packet; and to send the IP tunneling packet to the UE via the IP tunnel.

25 Claims, 11 Drawing Sheets

(51) Int. Cl.
*H04W 12/06* (2009.01)
*H04W 76/11* (2018.01)
*H04W 76/12* (2018.01)
*H04W 80/08* (2009.01)
*H04W 84/12* (2009.01)

(52) U.S. Cl.
CPC ............ *H04W 76/11* (2018.02); *H04W 76/12* (2018.02); *H04W 80/08* (2013.01); *H04W 84/12* (2013.01)

(56) References Cited

U.S. PATENT DOCUMENTS

| | | | |
|---|---|---|---|
| 2011/0090794 A1 | 4/2011 | Cherian et al. | |
| 2011/0213310 A1* | 9/2011 | Bierman | A61M 25/02 604/180 |
| 2012/0044949 A1 | 2/2012 | Velev et al. | |
| 2012/0195243 A1* | 8/2012 | Choi | H04W 72/0453 370/311 |
| 2012/0224485 A1 | 9/2012 | Payyappilly et al. | |
| 2014/0079022 A1 | 3/2014 | Wang et al. | |
| 2014/0086211 A1 | 3/2014 | Liu | |
| 2014/0269621 A1 | 9/2014 | Gu | |
| 2014/0321439 A1* | 10/2014 | Choi | H04W 72/0453 370/336 |
| 2017/0099625 A1* | 4/2017 | Li | H04W 28/08 |
| 2017/0353218 A1* | 12/2017 | Choi | H04W 72/0453 |

OTHER PUBLICATIONS

3GPP TS 36.300 V11.7.0 (Sep. 2013); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)), 209 pages.

IEEE Std 802.111N-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

International Search Report and Written Opinion for PCT/US2015/000342, dated Apr. 12, 2016, 13 pages.

International Preliminary Report on Patentability for PCT/US2015/000342, dated Feb. 8, 2018, 10 pages.

Wonyoung Yoon et al., Enhanced Non-Seamless Offload for LTE and WLAN networks, IEEE Communications Letters, vol. 17, Sep. 6, 2013, 5 pages.

European Search Report for European Patent Application No. 15899774.2, dated Feb. 18, 2019, 8 pages.

Daniel Migault et al, "E2E: An Optimized IPsec Architecture for Secure and Fast Offload", Availability, Reliability and Security (ARES), 2012 Seventh International Conference on, IEEE, Aug. 20, 2012, 10 pages.

* cited by examiner

APPARATUS, SYSTEM AND METHOD OF COMMUNICATING BETWEEN A CELLULAR MANAGER AND A USER EQUIPMENT (UE) VIA A WLAN NODE

CROSS REFERENCE

This application claims the benefit of and priority from U.S. Provisional Patent Application No. 62/196,456 entitled "LTE/WLAN AGGREGATION (LWA) ABOVE PDCP WITH IP/IPSEC TUNNEL", filed Jul. 24, 2015, the entire disclosure of which is incorporated herein by reference.

TECHNICAL FIELD

Some embodiments described herein generally relate to communicating between a cellular manager and a User Equipment (UE) via a Wireless Local Area network (WLAN) node.

BACKGROUND

A wireless communication device, e.g., a mobile device, may be configured to utilize multiple wireless communication technologies.

For example, a User Equipment (UE) device may be configured to utilize a cellular connection, e.g., a Universal Mobile Telecommunications System (UMTS) cellular connection or a Long Term Evolution (LTE) connection, as well as a wireless-local-area-network (WLAN) connection, e.g., a Wireless-Fidelity (WiFi) connection.

There is a need for efficient interworking, integration and/or management of the cellular and WLAN radio access technologies.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
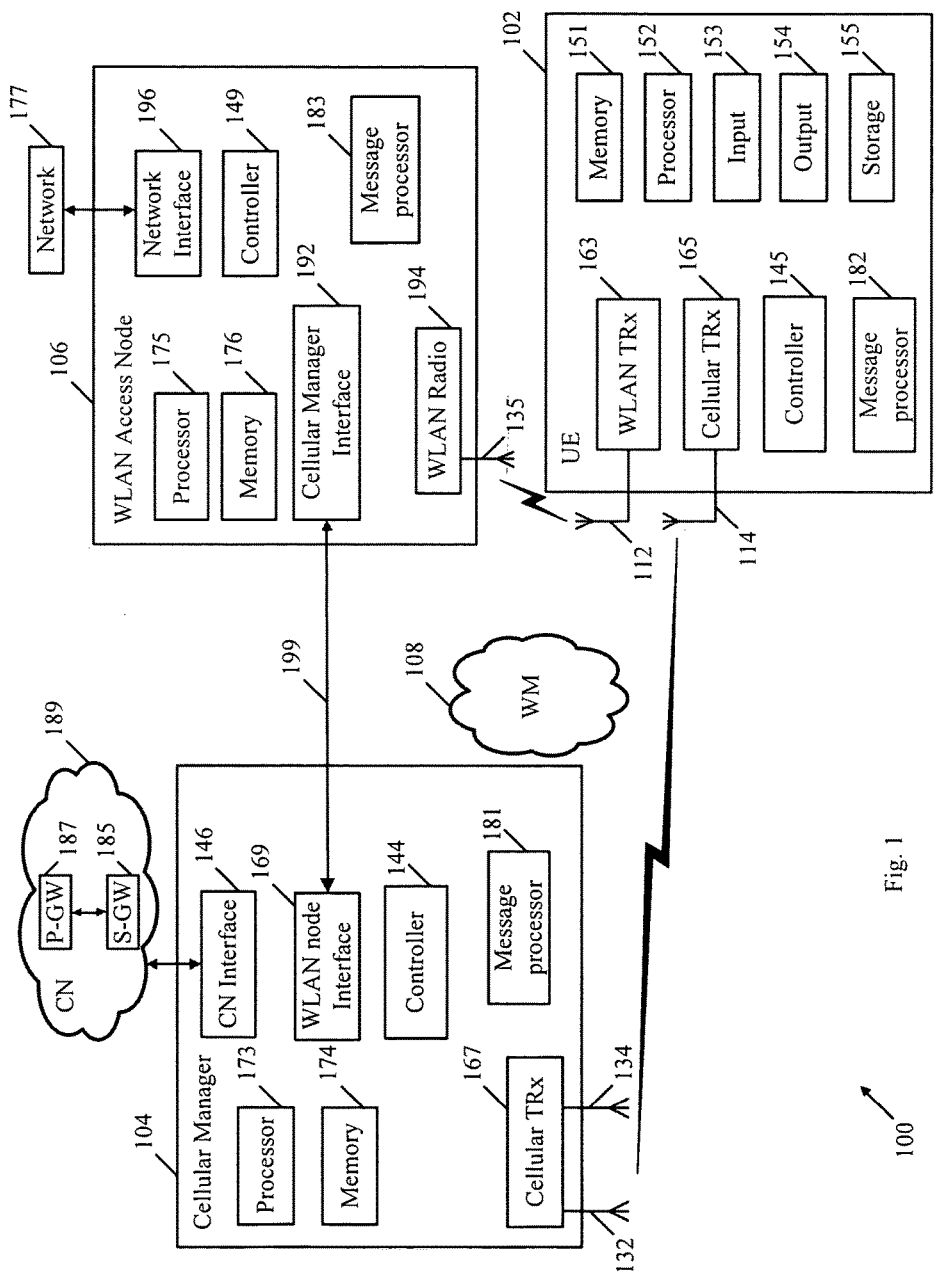
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, an Internet of Things (IoT) device, a sensor device, a wearable device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing 3rd Generation Partnership Project (3GPP) and/or Long Term Evolution (LTE) specifications (including 3GPP TS 36.300 ("*TS 36.300 Evolved Universal Terrestrial Radio Access (E-UTRA) and Evolved Universal Terrestrial Radio Access Network (E-UTRAN); Overall description; Stage 2, version 11.7.0 Release 11*", September 2013)) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing IEEE 802.11 standards (*IEEE 802.11-2012, IEEE Standard for Information technology— Telecommunications and information exchange between systems Local and metropolitan area networks—Specific requirements Part* 11: *Wireless LAN Medium Access Control (MAC) and Physical Layer (PHY) Specifications, Mar.* 29, 2012), and/or future versions and/or derivatives thereof, devices and/or networks operating in accordance with existing IEEE 802.16 standards (*IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1xRTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a node (also referred to as a "base station"), or the like. The linking between a carrier frequency of the downlink resources and a carrier frequency of the uplink resources may be indicated in system information transmitted on the downlink resources.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMAX cellular network, and the like.

Some demonstrative embodiments are described herein with respect to a WLAN system, a WiFi system, and/or a WiGig system. However, other embodiments may be implemented in any other suitable non-cellular network.

Some demonstrative embodiments are described herein with respect to a WLAN Access Point (AP). However, other embodiments may be implemented in any other WLAN nod, a WLAN access device, a WLAN access manager, and/or a WLAN Access Controller (AC).

Some demonstrative embodiments may be used in conjunction with a Heterogeneous Network (HetNet), which may utilize a deployment of a mix of technologies, frequencies, cell sizes and/or network architectures, e.g., including cellular, millimeter wave ("mmWave" or "mmW"), and/or the like. In one example, the HetNet may include a radio access network having layers of different-sized cells ranging from large macrocells to small cells, for example, picocells and femtocells.

Other embodiments may be used in conjunction with any other suitable wireless communication network.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include at least one cellular manager 104 to manage communication of a cellular network, e.g., as described below.

In some demonstrative embodiments, cellular manager 104 may include and/or may perform the functionality of an Evolved Node B (eNB). For example, cellular manager 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations, communications, and/or functionality.

In other embodiments, cellular manager 104 may include any other functionality and/or may perform the functionality of any other cellular node, network controller, base station or any other node or network device.

In one example, cellular manager 104 may be part of a UMTS. According to this example, cellular manager 104 may perform the functionality of a Radio Network Controller (RNC), which may control a plurality of Node B devices (not shown in FIG. 1). For example, the node B may be configured to communicate directly with UEs, e.g., including UE 102, for example, using a Wideband Code Division Multiple Access (WCDMA) and/or Time Division Synchronous Code Division Multiple Access (TD-SCDMA) air interface technology. The RNC may include, for example, a UMTS RNC configured to control the Node B devices.

In some demonstrative embodiments, system 100 may include a WLAN node 106 to manage access to a non-cellular network 107, for example, a WLAN, e.g., a Basic Service Set (BSS).

In some demonstrative embodiments, WLAN node 106 may include, may operate as, and/or may perform at least part of the functionality of, a WLAN AP, WLAN AC, or a WLAN Termination (WT) node, e.g., as described below.

In other embodiments, WLAN node 106 may include any other functionality and/or may perform the functionality of any other device capable of controlling and/or managing WLAN radio access to one or more wired networks.

In one example, WLAN node 106 may perform the functionality of an Access Controller (AC). According to this example, WLAN node 106 may control a plurality of AP devices, e.g., Lightweight Access Point (LAP) devices (not shown in FIG. 1).

In some demonstrative embodiments, UE 102 may include, for example, a Mobile Device (MD), a Station (STA), a mobile computer, a laptop computer, a notebook computer, a tablet computer, an Ultrabook™ computer, an Internet of Things (IoT) device, a wearable device, a sensor device, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, cellular manager 104 and/or WLAN node 106 may include one or more communication interfaces to perform communication between UE 102, cellular manager 104, WLAN node 106 and/or with one or more other wireless communication devices, e.g., as described below.

Some demonstrative embodiments include an interface 199 (also referred to as "the access device interface", "the horizontal interface", "the "Xw interface", "the X2-W interface" or "the cellular/WLAN interface"), which may include circuitry and/or logic configured to interface between a cellular network element, e.g., cellular manager 104, and a WLAN element, e.g., WLAN node 106, as described in detail below.

In some demonstrative embodiments, interface 199 may be implemented by any wired and/or wireless link, e.g., using any suitable, Physical Layer (PHY) components and/or protocols.

In some demonstrative embodiments, interface 199 may be implemented to interface between an eNB and WLAN node 106, e.g., as described below. However, in other embodiments, the interface 199 may be implemented to directly interface between any other cellular device and any other WLAN device.

In some demonstrative embodiments, cellular manager 104 may include an interface ("Core Network (CN) interface") 146, e.g., a vertical interface, including circuitry and/or logic configured to communicate with one or more elements of a CN 189, e.g., an Evolved Packet Core (EPC).

In some demonstrative embodiments, CN interface 146 may include an S1 vertical interface configured to communicate between cellular manager 104 and a Serving Gateway (S-GW) 185 according to an S1 protocol, e.g., if cellular manager 104 performs the functionality of an eNB. According to this example, S-GW 187 may interface between cellular manager 104 and a Packet Data Network (PDN) Gateway (P-GW) 187.

In other embodiments, CN interface 146 may include any other vertical interface with one or more elements of CN 189. For example, cellular manger 104 may perform the functionality of an RNC, e.g., in a UMTS system. According to this example, CN interface 146 may include an Interface Unit Circuit Switch (Iu-CS) interface and/or an Interface Unit Packet Switch (Iu-PS) interface, to interface between the RNC and one or more packet-switched or circuit-switched CN elements.

In some demonstrative embodiments, cellular manager 104 may include an interface including circuitry and/or logic to communicate user plane traffic, directly or indirectly, between CN 189 and UE 102.

In some demonstrative embodiments, cellular manager 104 may communicate the user plane traffic directly with UE 102, for example, if cellular manager 104 performs the functionality of an eNB. According to these embodiments, cellular manager 104 may include an air interface, for example, a cellular transceiver (TRx) 167, including circuitry and/or logic configured to communicate with UE 102 via a cellular link. In other embodiments, cellular manager 104 may communicate the user plane traffic with UE 102 via a Node B, e.g., if cellular manager 104 performs the functionality of an RNC. According to these embodiments, cellular manager 104 may include a Node B interface to communicate between the RNC and the Node B.

In some demonstrative embodiments, cellular manager 104 may include a WLAN node interface 169 (also referred to as "WLAN control interface") including circuitry and/or logic configured to communicate with WLAN node 106, e.g., as described below. In one example, interface 169 may include an AP interface, e.g., if WLAN node 106 performs the functionality of an AP. In another example, interface 169 may include any other non-cellular RAT interface to communicate with a node of a non-cellular RAT network.

In some demonstrative embodiments, WLAN node 106 may include a cell manager interface ("the cellular interface") 192 including circuitry and/or logic configured to communicate with cellular manager 104. In one example, interface 192 may include an eNB interface, e.g., if cellular manager 104 performs the functionality of an eNB. In another example, interface 192 may include a RNC interface, e.g., if cellular manager 104 performs the functionality of a RNC.

In some demonstrative embodiments, interfaces 169 and 192 may be configured to communicate between cellular manager 104 and WLAN node 106 via a link of interface 199.

In some demonstrative embodiments, WLAN node 106 may include a network interface 196 including circuitry and/or logic configured to communicate network traffic with a wired network 177, e.g., the Internet and/or any other network.

In some demonstrative embodiments, WLAN access device 104 may include a WLAN radio 194 including circuitry and/or logic configured to communicate the network traffic and/or any other traffic with UE 102 via a WLAN, directly or indirectly, e.g., via a WLAN link between WLAN node 106 and UE 102.

In some demonstrative embodiments, UE 102 may include a non-cellular RAT transceiver (TRx), for example, a WLAN TRx 163, including circuitry and/or logic configured to communicate with a WLAN device, e.g., with WLAN node 106, via the WLAN link. Some embodiments are described below with respect to a UE, e.g., UE 102, including a WLAN TRx to communicate over a WLAN. For example, WLAN TRx 163 may include a WLAN Network Interface Card (NIC). In other embodiments, the UE may include any additional or alternative non-cellular RAT TRx, e.g., a Bluetooth TRx and/or any other TRx, to communicate over any additional or alternative non-cellular RAT network.

In some demonstrative embodiments, UE 102 may include a cellular transceiver (TRx) 165 including circuitry and/or logic configured to communicate with a cellular network, for example, via a cellular device, cellular manager 104, via the cellular link. For example, cellular TRx 165 may include a cellular modulator-demodulator (modem), e.g., and LTE modem.

In some demonstrative embodiments, WLAN TRx 163, cellular TRx 165, cellular TRx 167 and/or WLAN radio 194 may include one or more wireless transmitters, receivers and/or transceivers including circuitry and/or logic to process, encode, decode, send and/or receive wireless communication signals, RF signals, frames, blocks, transmission streams, packets, messages, data items, and/or data.

In some demonstrative embodiments, WLAN TRx 167 and/or WLAN radio 194 may include one or more wireless receivers (Rx) including circuitry and/or logic to receive wireless communication signals, RF signals, frames, blocks, transmission streams, packets, messages, data items, and/or data; and/or one or more wireless transmitters (Tx) including circuitry and/or logic to send wireless communication signals, RF signals, frames, blocks, transmission streams, packets, messages, data items, and/or data. For example, WLAN TRx 167 and/or WLAN radio 194 may include circuitry;

logic; Radio Frequency (RF) elements, circuitry and/or logic; baseband elements, circuitry and/or logic; modulation elements, circuitry and/or logic; demodulation elements, Circuitry and/or logic; amplifiers; analog to digital and/or digital to analog converters; filters; and/or the like.

In some demonstrative embodiments, cellular TRx 167 and/or cellular TRx 165 may include a multiple input multiple output (MIMO) transmitters receivers system (not shown), which may be capable of performing antenna beamforming methods, if desired. In other embodiments, cellular TRx 167 and/or cellular TRx 165 may include any other transmitters and/or receivers.

In some demonstrative embodiments, cellular TRx 167 and/or cellular TRx 165 may include LTE, WCDMA and/or TD-SCDMA modulator and/or demodulator circuitry (not shown) configured to modulate and/or demodulate downlink signals to be communicated over downlink channels, e.g., between cellular manager 104 and UE 102, and/or uplink signals to be communicated over uplink channels, e.g., between UE 102 and cellular manager 104. In other embodiments, cellular TRx 167 and/or cellular TRx 165 may include any other modulators and/or demodulators.

In some demonstrative embodiments, cellular TRx 167 and/or cellular TRx 165 may include a turbo decoder and/or a turbo encoder (not shown) including circuitry and/or logic for encoding and/or decoding data bits into data symbols, if desired. In some demonstrative embodiments, cellular TRx 167 and/or cellular TRx 165 may include OFDM and/or SC-FDMA modulators and/or demodulators (not shown) configured to communicate OFDM signals over downlink (DL) channels, and/or SC-FDMA signals over uplink (UL) channels.

In some demonstrative embodiments, UE 102 may establish a WLAN link with WLAN node 106. For example, WLAN TRx 163 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from the WLAN node 106 to the one or more STAs. The uplink may include, for example, a unidirectional link from a STA to the WLAN node 106.

In some demonstrative embodiments, UE 102, cellular manager 104, and/or WLAN node 106, may include, or may be associated with, one or more antennas. In one example, WLAN TRx 163 and/or cellular TRx 165 may be associated with at least two antennas, e.g., antennas 112 and 114, or any other number of antennas, e.g., one antenna or more than two antennas; cellular TRx 167 may be associated with at least two antennas, e.g., antennas 132 and 134, or any other number of antennas, e.g., one antenna or more than two antennas; and/or WLAN radio 194 may be associated with one or more antennas 135.

In some demonstrative embodiments, antennas 112, 114, 132, 134 and/or 135 may include any type of antennas suitable for transmitting and/or receiving wireless communication signals, blocks, frames, transmission streams, packets, messages and/or data. For example, antennas 112, 114, 132, 134 and/or 135 may include any suitable configuration, structure and/or arrangement of one or more antenna elements, components, units, assemblies and/or arrays. For example, antennas 112, 114, 132, 134 and/or 135 may include a phased array antenna, a dipole antenna, a single element antenna, a set of switched beam antennas, and/or the like.

In some embodiments, antennas 112, 114, 132, 134 and/or 135 may implement transmit and receive functionalities using separate transmit and receive antenna elements. In some embodiments, antennas 112, 114, 132, 134 and/or 135 may implement transmit and receive functionalities using common and/or integrated transmit/receive elements.

In some demonstrative embodiments, cellular manager 104 may include at least one controller component 144, UE 102 may include at least one controller component 145, and/or WLAN node 106 may include at least one controller component 149. Controllers 144, 145, and/or 149 may be configured to trigger one or more communications, may generate and/or trigger communication of one or more messages and/or transmissions, and/or may perform one or more functionalities, operations and/or procedures, e.g., as described below.

In some demonstrative embodiments, controllers 144, 145, and/or 149 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 144, 145, and/or 149, respectively. Additionally or alternatively, one or more functionalities of controllers 144, 145, and/or 149 may be implemented by logic, which may be executed by a machine and/or one or more processors, e.g., as described below.

In one example, controller 144 may include circuitry and/or logic, for example, one or more processors including circuitry and/or logic, configured to cause, request and/or trigger cellular manager 104 to perform one or More operations, communications and/or functionalities, e.g., as described herein. In one example, controller 145 may include circuitry and/or logic, for example, one or more processors including circuitry and/or logic, configured to cause, request and/or trigger UE 102 to perform one or more operations, communications and/or functionalities, e.g., as described herein. In one example, controller 149 may include circuitry and/or logic, for example, one or more processors including circuitry and/or logic, configured to cause, request and/or trigger WLAN node 106 to perform one or more operations, communications and/or functionalities, e.g., as described herein.

In some demonstrative embodiments, cellular manager 104 may include a message processor 181 configured to generate, process and/or access one or messages communicated by cellular manager 104. In one example, message processor 181 may be configured to generate one or more messages to be transmitted by cellular manager 104, and/or message processor 181 may be configured to access and/or to process one or more messages received by cellular manager 104, e.g., as described below.

In some demonstrative embodiments, UE 102 may include a message processor 182 configured to generate, process and/or access one or messages communicated by UE 102. In one example, message processor 182 may be configured to generate one or more messages to be transmitted by UE 102, and/or message processor 182 may be configured to access and/or to process one or more messages received by UE 102, e.g., as described below.

In some demonstrative embodiments, WLAN node 106 may include a message processor 183 configured to generate, process and/or access one or messages communicated by WLAN node 106. In one example, message processor 183 may be configured to generate one or more messages to be transmitted by WLAN node 106, and/or message processor 183 may be configured to access and/or to process one or more messages received by WLAN node 106, e.g., as described below.

In some demonstrative embodiments, message processors 181, 182 and/or 183 may include circuitry, e.g., processor circuitry, memory circuitry, Media-Access Control (MAC) circuitry, Physical Layer (PHY) circuitry, and/or any other circuitry, configured to perform the functionality of message processors 181, 182 and/or 183. Additionally or alternatively, one or more functionalities of message processors 181, 182 and/or 183 may be implemented by logic, which may be executed by a machine and/or one or more processors, e.g., as described below.

In some demonstrative embodiments, at least part of the functionality of message processor 181 may be implemented as part of cellular TRx 167 and/or WLAN node interface 169; at least part of the functionality of message processor 182 may be implemented as part of cellular TRx 165 and/or WLAN TRx 163; and/or at least part of the functionality of message processor 183 may be implemented as part of interface 192 and/or WLAN radio 194.

In some demonstrative embodiments, at least part of the functionality of message processor 181 may be implemented as part of controller 144, at least part of the functionality of message processor 182 may be implemented as part of controller 145, and/or at least part of the functionality of message processor 183 may be implemented as part of controller 149.

In other embodiments, at least part of the functionality of message processor 181 may be implemented as part of any other element of cellular manager 104, at least part of the functionality of message processor 182 may be implemented as part of any other element of UE 102, and/or at least part of the functionality of message processor 183 may be implemented as part of any other element of WLAN node 106.

In some demonstrative embodiments, at least part of the functionality of controller 145, and/or message processor 182 may be implemented by an integrated circuit, for example, a chip, e.g., a System on Chip (SoC). In one example, the chip or SoC may be configured to perform one or more functionalities of cellular transceiver 165 and/or WLAN TRx 163. For example, the chip or SoC may include one or more elements of controller 145, message processor 182, and/or one or more elements of cellular transceiver 165 and/or WLAN TRx 163. In one example, controller 145; message processor 182, cellular transceiver 163, and WLAN TRx 163 may be implemented as part of the chip or SoC. In other embodiments, controller 145, message processor 182, cellular transceiver 165 and/or WLAN TRx 163 may be implemented by one or more additional or alternative elements of UE 102.

In some demonstrative embodiments, at least part of the functionality of controller 144 and/or message processor 181 may be implemented by an integrated circuit, for example, a chip, e.g., a System on Chip (SoC). In one example, the chip or SoC may be configured to perform one or more functionalities of cellular transceiver 167 and/or WLAN node interface 169. For example, the chip or SoC may include one or more elements of controller 144, message processor 181, and/or one or more elements of cellular transceiver 167 and/or WLAN node interface 169. In one example, controller 144, message processor 181, cellular transceiver 167, and WLAN node interface 169 may be implemented as part of the chip or SoC. In other embodiments, controller 144, message processor 181, cellular transceiver 167 and/or WLAN node interface 169 may be implemented by one or more additional or alternative elements of cellular manager 104.

In some demonstrative embodiments, at least part of the functionality of controller 149 and/or message processor 183 may be implemented by an integrated circuit, for example, a chip, e.g., a System on Chip (SoC). In one example, the chip or SoC may be configured to perform one or more functionalities of WLAN radio 194 and/or cellular manager interface 192. For example, the chip or SoC may include one or more elements of controller 149, message processor 183, and/or one or more elements of WLAN radio 194 and/or cellular manager interface 192. In one example, controller 149, message processor 183, WLAN radio 194, and cellular manager interface 192 may be implemented as part of the chip or SoC. In other embodiments, controller 149, message processor 183, WLAN radio 194 and/or cellular manager interface 192 may be implemented by one or more additional or alternative elements of WLAN node 106.

In some demonstrative embodiments, cellular manager 104, WLAN node 106, and/or UE 102 may also include, for example, one or more of a processor, an input unit, an output unit, a memory unit, and/or a storage unit. For example, cellular manager 104 may include a processor 173 and/or a memory 174; WLAN node 106 may include a processor 175 and/or a memory 176; and/or UE 102 may include a memory 151, a processor 152, an input unit 153, an output unit 154, and/or a storage unit 155. UE 102, cellular manager 104 and/or WLAN node 106 may optionally include other suitable hardware components and/or software components. In some demonstrative embodiments, some or all of the components of one or more of UE 102, cellular manager 104 and/or WLAN node 106 may be enclosed in a common housing or packaging, and may be interconnected or operably associated using one or more wired or wireless links. In other embodiments, components of one or more of UE 102, cellular manager 104 and/or WLAN node 106 may be distributed among multiple or separate devices.

In some demonstrative embodiments, processors 173, 175 and/or 152 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 173 may execute instructions, for example, of an Operating System (OS) of cellular manager 104 and/or of one or more suitable applications; processor 175 may execute instructions of an OS of WLAN node 106 and/or of one or more suitable applications; and/or processor 152 may execute instructions of an OS of UE 102 and/or of one or more suitable applications.

In some demonstrative embodiments, input unit 153 may include, for example, a keyboard, a keypad, a mouse, a touch-screen, a touch-pad, a track-ball, a stylus, a microphone, or other suitable pointing device or input device. Output unit 154 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 174, 176 and/or 151 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 155 includes, for example, a hard disk drive, a floppy disk drive, a Compact Disk (CD) drive, a CD-ROM drive, a DVD drive, or other suitable removable or non-removable storage units. For example, memory unit 174 may store data processed by cellular manager 104; memory unit 151 may store data processed by UE 102; and/or memory unit 176 may store data processed by WLAN node 106.

In some demonstrative embodiments, UE 102 may be configured utilize a cellular connection, e.g., a LTE cellular connection or any other cellular connection, to communicate with cellular manager 104, and a WLAN connection, e.g., a Wireless-Fidelity (WiFi) connection, a mmWave connection, a P2P connection, or any other WLAN, e.g., WiGig, connection, to communicate with WLAN node 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, cellular manager 104 and/or WLAN node 106 may be configured to communicate via interface 199, for example, to enhance and/or increase the efficiency of interworking, integration and/or management of the cellular and WLAN radio access technologies, e.g., as described below.

In some demonstrative embodiments, cellular manager 104 and/or WLAN node 106 may be configured to communicate via interface 199, for example, at least to control LTE/WLAN aggregation, and/or to communicate traffic for LTE/WLAN aggregation.

In some demonstrative embodiments, cellular manager 104 and/or WLAN node 106 may be configured to communicate via interface 199, for example, at least to transport data packets, e.g., Packet Data Convergence Protocol (PDCP) Protocol Data Units (PDUs), cellular manager 104 and WLAN node 106, to control aggregation, e.g., from cellular manager 104 to WLAN node 106, and/or to gather statistics and/or other information, e.g., from WLAN node 106 to cellular manager 104, as described below.

In some demonstrative embodiments, cellular manager 104 and/or WLAN node 106 may be configured according to a network architecture of a non-collocated LTE/WLAN aggregation, e.g., in which cellular manager 104 and WLAN node 106 are not collocated as part of an integrated device and/or in which interface 199 is not an internal interface.

In some demonstrative embodiments, cellular manager 104 and/or WLAN node 106 may be configured to communicate, e.g., via interface 199, in accordance with a dual connectivity (DC) architecture for split bearers, e.g., as described below.

In some demonstrative embodiments, the DC architecture may be configured to enable cellular manager 104 to send packets belonging to a single bearer either directly to UE 102 or via WLAN node 106.

In other embodiments, cellular manager 104 and/or WLAN node 106 may be configured to communicate in accordance with any other additional or alternative architecture.

In some demonstrative embodiments, controller 144 may control cellular TRx 167 to communicate with UE 102 traffic of at least one Evolved Universal Mobile Telecommunications System (UMTS) Terrestrial Radio Access Network (E-UTRAN) Radio Access Bearer (E-RAB).

In some demonstrative embodiments, Controller 144 may be configured to cause cellular manager 104 to route at least part of the traffic of the E-RAB via WLAN node 106, e.g., as described below.

In some demonstrative embodiments, cellular manager 104 may receive downlink traffic from CN 189 ("CN downlink traffic"), e.g., via CN interface 146. Cellular manager 104 may cause WLAN node interface 169 to send the CN downlink traffic to WLAN node 106. According to these embodiments, WLAN node 106 may receive the CN download traffic from cellular manager 104, e.g., via interface 192, and may send the CN download traffic to UE 102 via the WLAN.

In one example, WLAN node 106 may directly transmit the CN downlink traffic to UE 102, e.g., via WLAN radio 194, for example, if WLAN node 106 performs the functionality of a WLAN AP.

In some demonstrative embodiments, steering traffic of the E-RAB between cellular manager 106 and WLAN access device 104 may enable, for example, to enhance, e.g., optimize, mobility of UE 102 between the cellular and WLAN radio networks.

Some LTE/WLAN Aggregation implementations may be based on a DC architecture with aggregation below PDCP and a GTP-U tunnel between an eNB and a WT node located in either a WLAN AP or a WLAN AC.

In some demonstrative embodiments, elements of system 100 may be configured to implement LTE/WLAN Aggregation based on an Internet Protocol (IP) tunnel, which may be established between an eNB, e.g., cellular manager 104, and a UE, e.g., UE 102, e.g., as described below.

In some demonstrative embodiments; establishment of the IP tunnel, and/or communication over the IP tunnel may be transparent to WLAN node 106. For example, WLAN node 106 may not be aware of the IP tunnel.

In some demonstrative embodiments, the IP tunnel may be configured to enable traffic steering and/or offloading above a PDCP layer, e.g., as described below. In other embodiments, the IP tunnel may be configured to enable traffic steering below the PDCP layer.

In some demonstrative embodiments, controller 144 may be configured to control cellular manager 104 to establish an IP tunnel between cellular manager 104 and UE 102 via WLAN node 106, and/or controller 145 may be configured to control UE 102 to establish the IP tunnel between cellular manager 104 and UE 102 via WLAN node 106, e.g., as described below.

In some demonstrative embodiments, controller 144 may be configured to control cellular manager 104 to encapsulate an IP payload including downlink traffic of the E-RAB in an IP tunneling packet, and to send the IP tunneling packet to UE 102 via the IP tunnel.

In some demonstrative embodiments, controller 145 may be configured to control UE 102 to process the IP tunneling packet received via the IP tunnel.

In some demonstrative embodiments, UE 102 may receive the downlink traffic the form of an IP payload encapsulated in a tunneling IP packet, for example, if aggregation above PDCP is used. Alternatively, for example, if aggregation below PDCP is used, a new IP protocol may be defined for PDCP. Controller component 145 may trigger UE 102 to extract the IP payload from the tunnel IP packet, and to forward the IP payload, for example, to a TCP/IP stack.

In some demonstrative embodiments, UE 102 may be configured to maps the received packets to an appropriate PDN connection (network interface), for example, based on PDN Connection information received from cellular manager 104, e.g., during LWA activation. Alternatively, a header with bearer ID, e.g. EPS bearer ID, may be added to the payload. In this case, UE 102 may map the packets to the appropriate PDN connection/network interface, for example, based on the bearer ID.

In some demonstrative embodiments, controller 145 may be configured to control UE 102 to encapsulate an IP payload including uplink traffic of the E-RAB in an IP tunneling packet, and to send the IP tunneling packet to cellular manager 104 via the IP tunnel.

In some demonstrative embodiments, controller 144 may be configured to control cellular manager 104 to process the IP tunneling packet including the uplink traffic received via the IP tunnel.

In some demonstrative embodiments, the IP tunnel may include a non-secure tunnel between UE 102 and cellular manager 104, e.g., as described below with reference to FIG. 2.

In some demonstrative embodiments, the IP tunnel may include an IP security (IPSec) tunnel, which may be configured to communicate the IP tunneling packets encrypted and authenticated according to an IPSec protocol, e.g., as described below with reference to FIG. 3.

Figure 2:
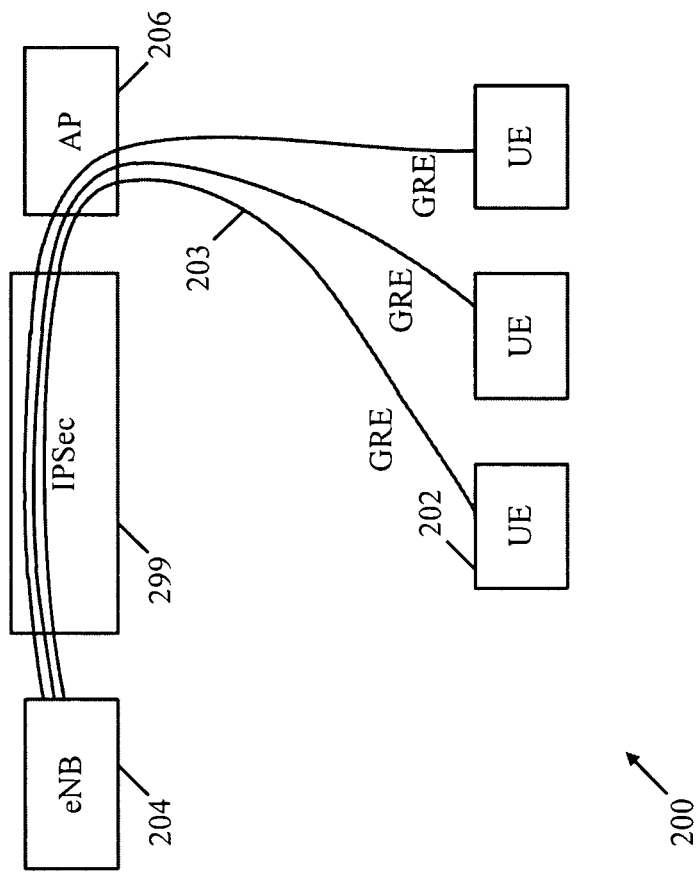
FIG. 2 is a schematic illustration of a first tunneling deployment, in accordance with some demonstrative embodiments.

Reference is made to FIG. 2, which schematically illustrates a first tunneling deployment 200, in accordance with some demonstrative embodiments.

In some demonstrative embodiments, tunneling deployment 200 may be configured to provide IP tunnels 203 between an eNB 204 and one or more UEs 202 via a WLAN AP 206. For example, cellular manager 104 (FIG. 1) may operate as eNB 204, UE 102 (FIG. 1) may operate as a UE 202 (FIG. 2), and/or WLAN node 106 (FIG. 1) may operate as WLAN AP 206.

In some demonstrative embodiments, tunneling deployment 200 may be configured based on a trusted WLAN deployment, for example, in which a backhaul 299 between eNB 204 and WLAN AP 206 may be considered trusted, e.g., protected by IPSec. According to this deployment, an IP tunnel 203 between eNB 204 and a UE 202 may be unencrypted. For example, IP tunnel may be based, for example, on a General Routing Encapsulation (GRE) scheme and/or any other non-secure tunneling scheme.

In some demonstrative embodiments, tunneling deployment 200 may implement, for example, an Extensible authentication protocol-authentication and key agreement authentication and encryption (EAP-AKA) protocol to authenticate and/or encrypt communications over the WLAN, e.g., between UE 202 and WLAN AP 206.

Figure 3:
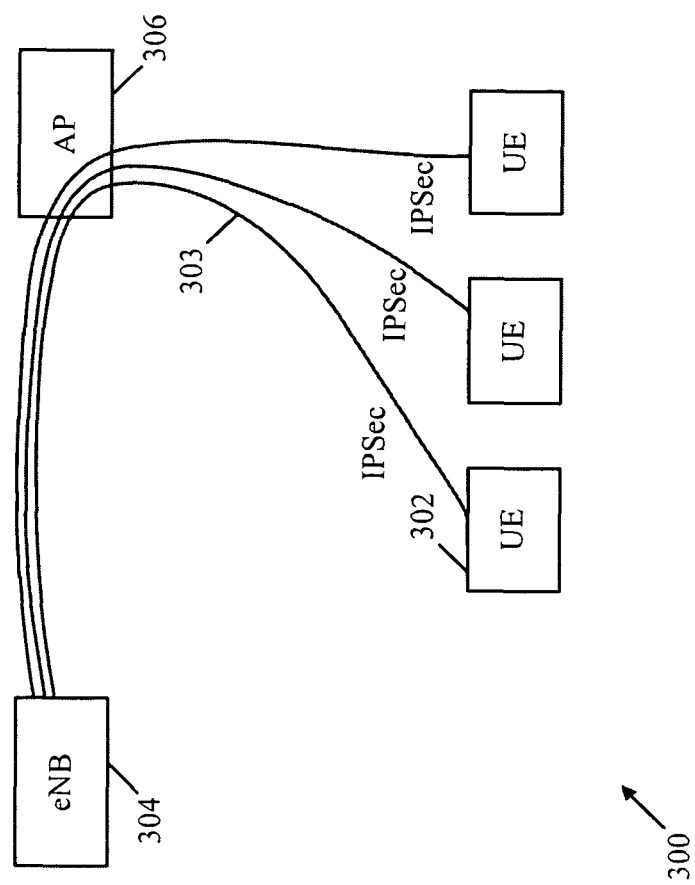
FIG. 3 is a schematic illustration of a second tunneling deployment, in accordance with some demonstrative embodiments.

Reference is made to FIG. 3, which schematically illustrates a second tunneling deployment 300, in accordance with some demonstrative embodiments.

In some demonstrative embodiments, tunneling deployment 300 may be configured to provide IP tunnels 303 between an eNB 304 and one or more UEs 302 via a WLAN AP 306. For example, cellular manager 104 (FIG. 1) may operate as eNB 304, UE 102 (FIG. 1) may operate as a UE 302 (FIG. 2), and/or WLAN node 106 (FIG. 1) may operate as WLAN AP 306.

In some demonstrative embodiments, tunneling deployment 300 may be configured based on an un-trusted WLAN deployment, for example, in which a backhaul between eNB 304 and WLAN AP 306 may be considered un-trusted. According to this deployment, an IP tunnel 303 between eNB 204 and a UE 302 may be protected, for example, according to an IPSec protocol.

In one example, tunneling deployment 300 may be implemented, for example, in cases where a WLAN may not be deployed by an operator of a cellular system including eNB 304, e.g., by a third party service provider.

Referring back to FIG. 1, in some demonstrative embodiments, controller 144 may be configured to trigger, cause, instruct and/or control cellular manager 104 to activate a link aggregation for UE 102 via WLAN node 106, e.g., as described below.

In some demonstrative embodiments, controller 144 may be configured to trigger, cause, instruct and/or control cellular manager 104 to signal to UE 102 a list of one or more aggregation enabled APs, e.g., including WLAN node 106.

In some demonstrative embodiments, the list of one or more aggregation enabled APs may be signaled to UE using broadcast and/or dedicated Radio Resource Control (RRC) signaling.

In some demonstrative embodiments, the list of one or more aggregation enabled APs may include one or more identifiers, for example, including one or more Basic Service Set Identifiers (IDs) (BSSIDs), one or more Service Set ID (SSIDs), one or more Homogenous Extended Service Set IDs (HESSIDs), and/or one or more other identifiers of the one or more WLAN nodes.

In some demonstrative embodiments, the list of one or more aggregation enabled APs may separate from a list of IDs used for other types of LTE/WLAN interworking.

In some demonstrative embodiments, controller 144 may be configured to trigger, cause, instruct and/or control cellular manager 104 to configure one or more WLAN suitability criteria in the form of one or more thresholds, for example, e.g. RSSI thresholds, to assist UE 102 in selecting a WLAN AP to be used for the link aggregation.

In some demonstrative embodiments, controller 144 may be configured to trigger, cause, instruct and/or control cellular manager 104 to configure one or more WLAN measurements to be performed by UE 102 for providing one or more measurement reports to cellular manager 104. The measurement reports may be used, for example, by cellular manager 104 to select a WLAN AP to be used for the link aggregation.

In some demonstrative embodiments, controller 145 may be configured to trigger, cause, instruct and/or control UE 102 to detect and/or select a suitable WLAN, for example, based on the list of one or more aggregation enabled APs and/or the WLAN suitability criteria.

In some demonstrative embodiments, the WLAN to be used by UE 102 form the link aggregation with cellular manager 104 may be selected by cellular manager 104, for example, based on the measurement reports from UE 102.

In some demonstrative embodiments, controller 145 may be configured to trigger, cause, instruct and/or control UE 102 to associate with the selected WLAN, e.g., the WLAN of WLAN AP 106.

In some demonstrative embodiments, controller 145 may be configured to trigger, cause, instruct and/or control UE 102 to process a WLAN message received via WLAN AP 106 including an IP address assigned to UE 102. The IP address assigned to UE 102 may be configured to be routable to cellular node 104.

In some demonstrative embodiments, controller 144 may be configured to trigger, cause, instruct and/or control cellular manager 104 to activate aggregation, for example, by optionally sending to UE 102 an IP address of cellular manager 104 and/or PDN connection information corresponding to the E-RAB. In one example, cellular node 104 may obtain information indicating which PDN connection each bearer belongs to, for example, via an S1 interface with an element of CN 189, e.g., an MME.

In some demonstrative embodiments, controller 145 may be configured to trigger, cause, instruct and/or control UE 102 to establishes an IP tunnel with cellular node 104, e.g., the GRE tunnel of FIG. 2, the IPSec tunnel of FIG. 3, and/or any other IP tunnel.

In some demonstrative embodiments, controller 144 may be configured to trigger, cause, instruct and/or control cellular manager 104 to initiate the IP tunnel establishment. According to these embodiments, for example, UE 102 may be configured to transmit to cellular manager 104 an indication of the IP address assigned to UE 102, for example, in a dedicated RRC message, e.g., as part of an aggregation activation complete message or any other message.

In some demonstrative embodiments, cellular node 104 and/or UE 102 may be configured to perform one or more security procedures, for example, when the IP tunnel is an IPSec tunnel, e.g., as described below.

In some demonstrative embodiments, once IP tunnel is established, UE 102 may receive downlink traffic of the E-RAB, and UE 402 may forward the downlink traffic to an appropriate network interface in an Operating System (OS) of UE 102, e.g., based on the PDN connection information.

In some demonstrative embodiments, an IP tunnel may be established per PDN connection. These embodiments may be configured, for example, to allow cellular manager 1094 and/or UE 102 to select an appropriate tunnel for traffic forwarding. Additionally or alternatively, these embodiments may be configured, for example, to support bearer level offloading, for example, by marking an EPS bearer ID, for example, using a new header within the IP payload, or one or more unused fields in the IP header, e.g. a Type of Service field used for DSCP markings. In one example, in a below PDCP implementation, the EPS bearer identifiers may be included, for example, within a modified PDCP header. Modifications may be made, for example, to the protocol type field in the IP header for example, if a non standard IP payload is included. In other embodiments, the IP tunnel may be established per bearer.

In some demonstrative embodiments, UE 102 and cellular manager 104 may establish the IP tunnel as a non-secure tunnel, for example, as described above with reference to FIG. 2.

In some demonstrative embodiments, when the IP tunnel is a non-secure tunnel, an EAP/AKA procedure, e.g., as defined in a 3GPP WLAN interworking specification, may be used, for example, assuming that UE 102 is allowed to access an Authentication, authorization, and accounting (AAA) server in CN 189, for example, to perform WLAN authentication and authorization.

In some demonstrative embodiments, cellular manager 104 may be configured to dynamically provision UE 102, e.g., WLAN TRx 163 of UE 102, and WLAN node 106 with a pre-shared key (PSK), which may be configured to start a 4-way handshake to establish a secure connection between the UE 102, e.g., WLAN TRx 163, and WLAN node 106, for example, without accessing the core network AAA server, e.g., as described below.

In some demonstrative embodiments, controller component 144 may be configured to generate key information, and to determine a WLAN shared key based at least on the key information, e.g., as described below.

In some demonstrative embodiments, controller component 144 may be configured to trigger WLAN node interface 169 to send to the WLAN node 106 the WLAN shared key, e.g., as described below.

In some demonstrative embodiments, controller component 144 may be configured to trigger cellular transceiver 167 to transmit to UE 102 a cellular message, e.g., an RRC message, including the key information, e.g., as described below.

In some demonstrative embodiments, UE 102 may receive the cellular message including the key information from cellular node 104, e.g., using cellular transceiver 167.

In some demonstrative embodiments, controller component 145 may be configured to generate a WLAN pre-shared key, e.g., identical to the WLAN pre-shared key generated by cellular node 104, for example, based at least on the key information, e.g., as described below.

In some demonstrative embodiments, controller component 145 may be configured to trigger WLAN transceiver 163 to establish a secure session with WLAN node 106, for example, using the WLAN pre-shared key, which may be identical to the WLAN pre-shared key provided by cellular manager 104 to WLAN node 106, e.g., as described below.

Figure 4:
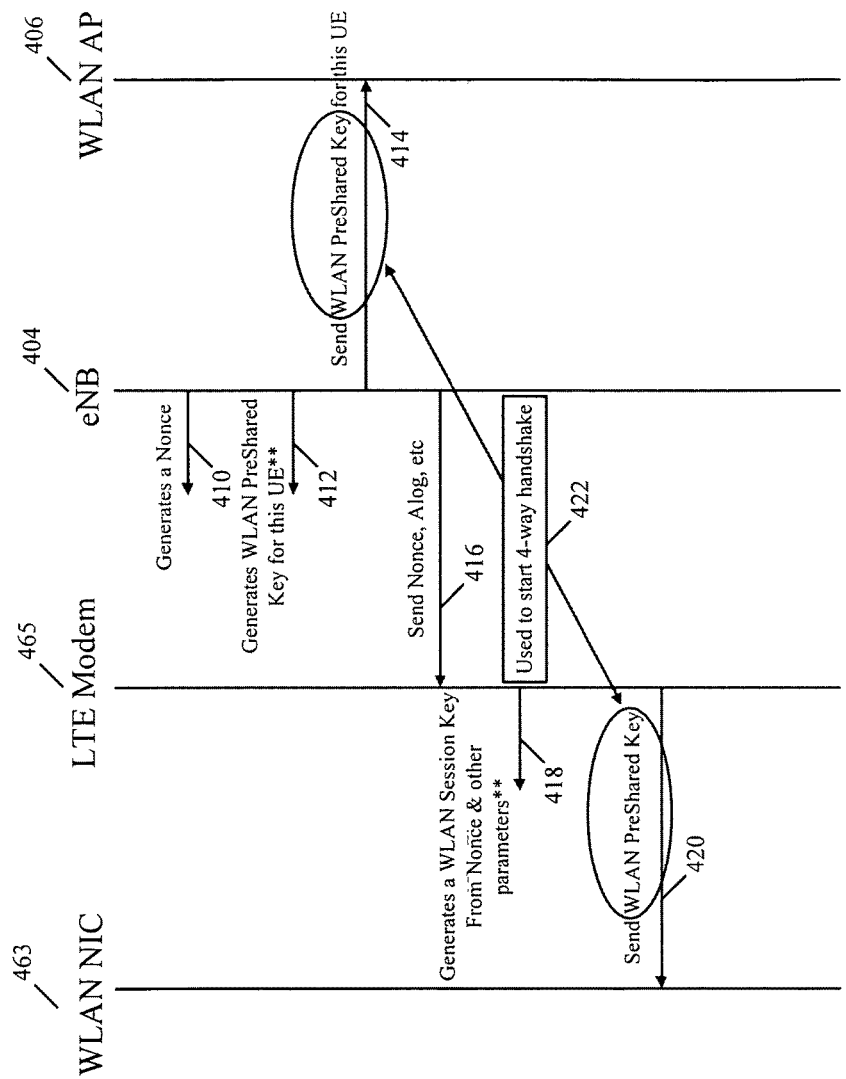
FIG. 4 is a schematic illustration of operations and communications of establishing a pre-shared key, in accordance with some demonstrative embodiments.

Reference is made to FIG. 4, which schematically illustrates operations and communications of establishing a pre-shared key, in accordance with some demonstrative embodiments.

In some demonstrative embodiments, an eNB 404, e.g., cellular manager 104 (FIG. 1), may be configured to generate (410) key information, for example, in the form of a nonce, e.g., a random number and/or a one-time password, and/or any other keying information.

In some demonstrative embodiments, the eNB 404, e.g., cellular manager 104 (FIG. 1), may use the key information to generate (412) a Pre-Shared Key (PSK), which may be configured for a WLAN 4-way handshake, e.g., as described below.

In one example, the WLAN Pre-Shared-key may be determined based on the key information, e.g., the nonce, generated by the eNB, and one or more other parameters, which may be known to the eNB 404 and to an LTE modem 465 of the UE, e.g., cellular transceiver 165 (FIG. 1) of UE 102 (FIG. 1). The one or more parameters may include, for example, an eNB Key (KeNB), a WLAN MAC address, and/or any other additional or alternative parameter.

In some demonstrative embodiments, the eNB 404, e.g., cellular manager 104 (FIG. 1), may send (414) the generated Pre-Shared-Key, to a WLAN AP 406, e.g., WLAN node 106 (FIG. 1).

In some demonstrative embodiments, the eNB 404, e.g., cellular manager 104 (FIG. 1) may send (416) the generated key information, e.g., the nonce, to the LTE modem 465, e.g., cellular TRx 165 (FIG. 1).

In some demonstrative embodiments, the LTE modem 465, e.g., cellular TRx 165 (FIG. 1), may generate (418) the Pre-Shared-key, which may be identical to the Pre-Shared-Key, which was generated (412) by the eNB 404 and sent (414) to WLAN AP 406. For example, the LTE modem 465, e.g., cellular TRx 165 (FIG. 1), may generate (418) the Pre-Shared-key based on the key information, e.g., the nonce, received (416) from eNB 404 and the one or more parameters, which may be known to the eNB 404 and to an LTE modem 465.

In some demonstrative embodiments, the LTE modem 465 may send (420) the Pre-Shared-Key to a WLAN NIC 463 of the UE, e.g., WLAN TRx 163 (FIG. 1), e.g., in a secure manner.

In some demonstrative embodiments, the WLAN NIC 463 of the UE, e.g., WLAN TRx 163 (FIG. 1), and the WLAN AP 406, e.g., WLAN node 106 (FIG. 1), may use the pre-shared key to perform a WLAN 4-way handshake (422), for example, according to an IEEE Standard, e.g., for WLAN authentication and/or for generating one or more WLAN encryption keys.

Referring back to FIG. 1, in some demonstrative embodiments, cellular manager 104, WLAN node 106, and/or UE 102 may be configured to implement a mechanism to mitigate or reduce an impact of an attack, for example, a Denial of Service (DoS) attack prior to the 4-way handshake, for example, where an attacker may launch a DoS attack by programmatically associating many UEs to the WLAN node 106.

In some demonstrative embodiments, cellular manager 104 may be configured to assist WLAN node 106 in access control to enable the WLAN node 106 to verify an eligible UE, for example, during a WLAN association process, or even prior to the association process, e.g., during a probe request/response exchange.

In some demonstrative embodiments, controller component 144 may be configured to trigger cellular transceiver 167 to transmit to UE 102 an aggregation initiation message, for example to initiate the link aggregation, e.g., as described above.

In some demonstrative embodiments, the link aggregation initiation message may include a WLAN identifier of WLAN node 106, e.g., the MAC address of WLAN node 106, the SSID of WLAN node 106, and/or any other identifier of WLAN node 106.

In some demonstrative embodiments, UE 102 may receive the link aggregation initiation message, e.g., via cellular TRx 165. Controller component 145 may be configured to trigger cellular transceiver 165 to transmit to cellular manager 104 a response message including a WLAN identifier of WLAN transceiver 163, for example, in response to the aggregation initiation message, e.g., as described below.

In some demonstrative embodiments, controller component 144 may be configured to process the response message from UE 102, and to trigger WLAN node interface 169 to send to WLAN node 106 an access request including the WLAN identifier of UE 102, e.g., as described below.

In some demonstrative embodiments, controller component 144 may be configured to trigger cellular transceiver 167 to transmit to UE 102 a connection request message including the key information, e.g., as described above with reference to FIG. 4, for example, upon receipt of an acknowledgement message from WLAN node 106, e.g., as described below.

Figure 5:
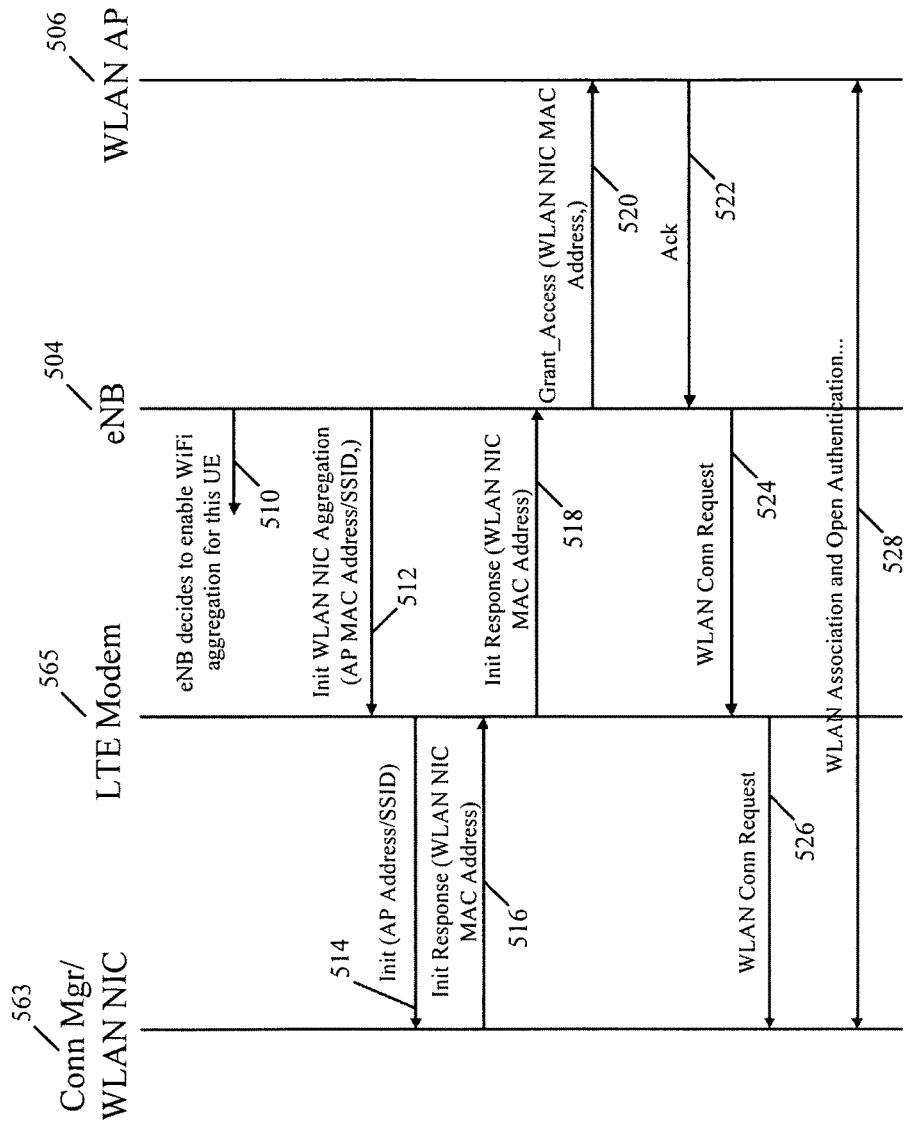
FIG. 5 is a schematic illustration of operations and communications of controlling access of a UE to a Wireless Local Area Network (WLAN) node, in accordance with some demonstrative embodiments.

Reference is made to FIG. 5, which schematically illustrates operations and communications of controlling access of a UE to a Wireless Local Area Network (WLAN) node, in accordance with some demonstrative embodiments.

In some demonstrative embodiments, an eNB 504, e.g., cellular manager 104 (FIG. 1), may decide (510) to enable WLAN aggregation for a UE, e.g., UE 102 (FIG. 1).

In some demonstrative embodiments, the eNB 504, e.g., cellular manager 104 (FIG. 1), may send an aggregation initiation message 512 addressed an LTE modem 565 of the UE, e.g., cellular TRx 165 (FIG. 1). The aggregation initiation message 512 may include, for example, an identifier, e.g., a MAC address and/or an SSID, of a WLAN AP 506, e.g., WLAN node 106 (FIG. 1).

In some demonstrative embodiments, LTE modem 565, e.g., cellular TRx 165 (FIG. 1), may process the aggregation initiation message 512, and may send an aggregation initiation request 514 to a connection manager and/or a WLAN NIC 563 of the UE, e.g., of controller 145 (FIG. 1) and/or WLAN TRx 163 (FIG. 1). The aggregation initiation request 514 may include, for example, the WLAN AP identifier of WLAN AP 506.

In some demonstrative embodiments, connection manager and/or a WLAN NIC 563 may process aggregation initiation request 514, and may send an aggregation initiation response 516 to LTE modem 565, e.g., cellular TRx 165 (FIG. 1). The aggregation initiation response 516 may include, for example, an identifier of the WLAN NIC 563, e.g., a MAC address of WLAN TRx 163 (FIG. 1).

In some demonstrative embodiments, LTE modem 565, e.g., cellular TRx 165 (FIG. 1), may process the aggregation initiation response 516, and may send an aggregation initiation response message 518 to eNB 504, e.g., cellular manager 104 (FIG. 1). The aggregation initiation response message 518 may include the identifier of the WLAN NIC 563, e.g., the MAC address of WLAN TRx 163 (FIG. 1).

In some demonstrative embodiments, eNB 504, e.g., cellular manager 104 (FIG. 1), may process the aggregation initiation response message 518, and may send a grant access message 520 to WLAN AP 506, e.g., WLAN node 106 (FIG. 1). The grant access message 520 may include the identifier of the WLAN NIC 563, e.g., the MAC address of WLAN TRx 163 (FIG. 1).

In some demonstrative embodiments, WLAN AP 506, e.g., WLAN node 106 (FIG. 1) may process the grant access message 520, and may send an acknowledgement (Ack) 522 to the eNB 504, e.g., cellular manager 104 (FIG. 1).

In some demonstrative embodiments, eNB 504, e.g., cellular manager 104 (FIG. 1), may send a WLAN connection request 524 to the UE, e.g., after receipt of the Ack 522.

In some demonstrative embodiments, LTE modem 565, e.g., cellular TRx 165 (FIG. 1), may process the WLAN connection request 524, and may a WLAN connection request 526 to the connection manager and/or a WLAN NIC 563 of the UE, e.g., of controller 145 (FIG. 1) and/or WLAN TRx 163 (FIG. 1).

In some demonstrative embodiments, the connection manager and/or a WLAN NIC 563 of the UE, e.g., of controller 145 (FIG. 1) and/or WLAN TRx 163 (FIG. 1), may perform a WLAN association and Open authentication with WLAN AP 506, e.g., WLAN node 106 (FIG. 1), for example, after receipt of the WLAN connection request 526.

Referring back to FIG. 1, in some demonstrative embodiments UE 102 and cellular manager 104 may establish the IP tunnel as an IPSec tunnel according to an IPSec protocol, for example, as described above with reference to FIG. 3.

In some demonstrative embodiments, the IPSec tunnel may use an end-to-end IPSec tunnel, e.g., an Internet Engineering Task Force (IETF) end-2-end IPSec Tunnel, between cellular manager 104 and the WLAN NIC of UE 102, e.g., WLAN TRx 163.

In some demonstrative embodiments, cellular manager 104 and/or UE 102 may be configured to dynamically bootstrap an IETF Internet Key Exchange protocol (IKEv2) to generate IPSec encryption keys, e.g., as described below.

In some, demonstrative embodiments, the IETF IKEv2 protocol may be used to generate an encryption key for the IPSec tunnel. For example, a IKEv2 phase 1 may be responsible for mutual authentication, which may include a Diffie Hellman key agreement to establish a secure session; and a mutual authentication, e.g., using a certificate or a pre-shared key, over the established secure session.

In some demonstrative embodiments, cellular manager 104 and/or UE 102 may be configured to utilize an eNB-Assisted Pre-Shared Key mechanism, which may enable to dynamically generate a Pre-Shared Key (PSK), to allow initiating a mutual authentication, e.g., in the IKEv2 phase 1.

In some demonstrative embodiments, controller component 144 may be configured to trigger cellular transceiver 167 to transmit to UE 102 a cellular message including a WLAN identifier of WLAN node 106, key information, e.g., a nonce, and an IP address of cellular manager 104, e.g., as described below.

In some demonstrative embodiments, cellular TRx 165 may receive the cellular message from cellular node 104, and controller component 145 may trigger WLAN transceiver 163 to establish a WLAN connection with WLAN node 106, for example, based on the WLAN identifier, e.g., as described below.

In some demonstrative embodiments, cellular manager 104 and/or UE 102 may be configured to perform a mutual authentication between UE 102 and cellular manager 104, for example, using the key information, and to establish an IPSec session between UE 102 and cellular manager 104 via the WLAN connection, e.g., as described below.

In some demonstrative embodiments, controller component 145 may be configured to trigger UE 102 to perform the mutual authentication between UE 102 and cellular manager 104 using the key information, and to establish the IPSec session between UE 102 and cellular manager 104 via the WLAN connection, e.g., as described below.

In some demonstrative embodiments, controller component 145 may be configured to determine a pre-shared key based at least on the key information in the cellular message, for example, together with the one or more parameters known to UE 102 and cellular manager 104, e.g., the KeNB, a MAC address, and/or any other parameter.

In some demonstrative embodiments, controller component 145 may be configured to trigger UE 102 to perform the mutual authentication with UE using the pre-shared key, e.g., as described below.

In some demonstrative embodiments, controller component 144 may be configured to trigger cellular manager 104 to perform the mutual authentication with UE 102 using the key information, and to establish the IPSec session with UE 102 via the WLAN node 106.

In some demonstrative embodiments, controller component 144 may be configured to determine a pre-shared key based at least on the key information in the cellular message, for example, together with the one or more parameters known to UE 102 and cellular manager 104, e.g., the KeNB, a MAC address, and/or any other parameter.

In some demonstrative embodiments, controller component 144 may be configured to trigger cellular manager 104 to perform the mutual authentication with UE using the pre-shared key, e.g., as described below.

Figure 6:
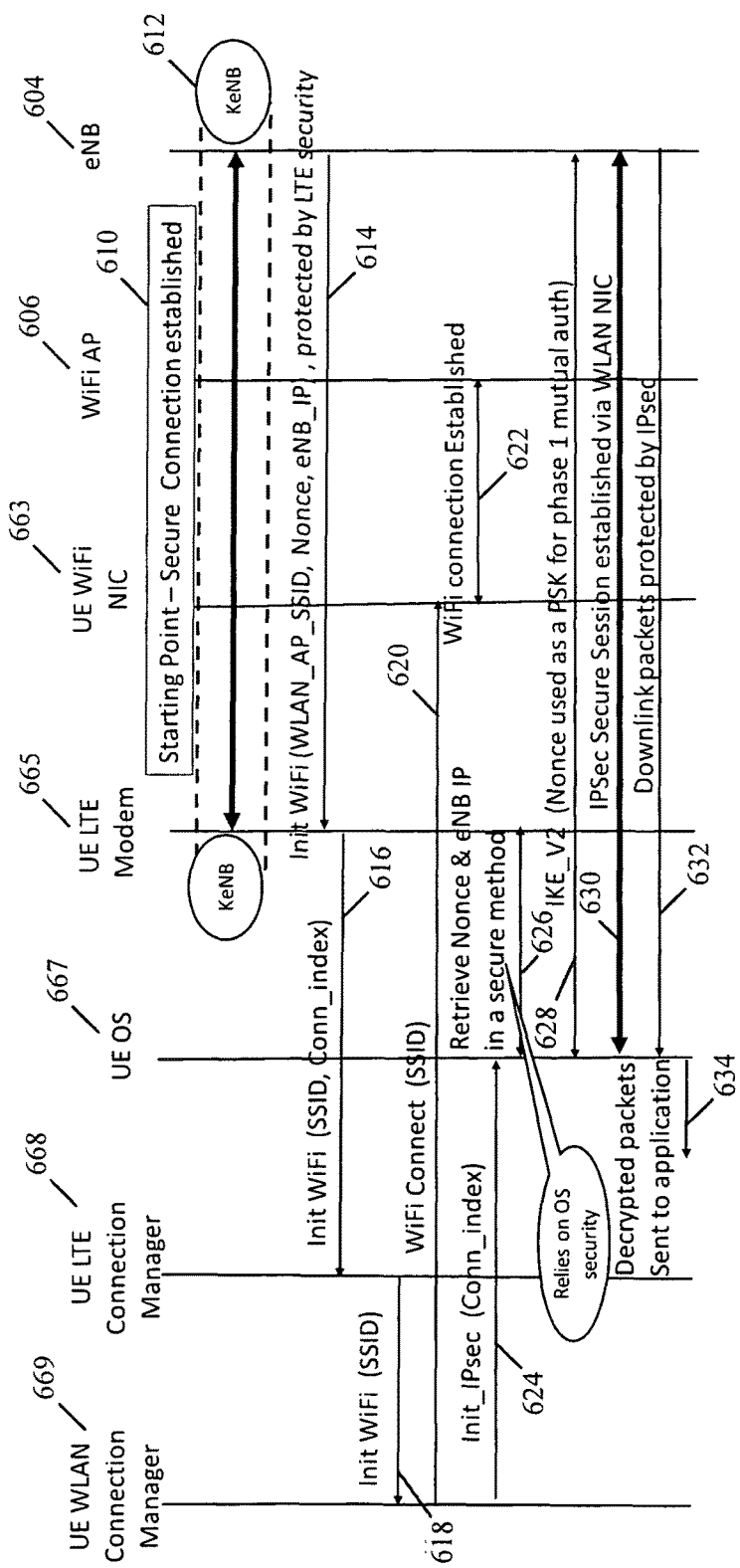
FIG. 6 is a schematic illustration of operations and communications of establishing a secure Internet Protocol (IP) session, in accordance with some demonstrative embodiments.

Reference is made to FIG. 6, which schematically illustrates operations and communications of establishing a secure IP session, in accordance with some demonstrative embodiments.

In some demonstrative embodiments, as, shown in FIG. 6, an eNB 604, e.g., cellular manager 104 (FIG. 1), may establish (610) a secure connection with a UE, for example, with an LTE cellular modem 665 of the UE, e.g., cellular TRx 165 (FIG. 1) of UE 102 (FIG. 1).

In some demonstrative embodiments, as shown in FIG. 6, the eNB 604 and LTE cellular modem 665 may both have information regarding one or more security parameters, which may be securely shared. For example, both the eNB 604, e.g., cellular manager 104 (FIG. 1), and the LTE cellular modem 665, e.g., cellular TRx 165 (FIG. 1), may have knowledge of an eNB Key (KeNB) 612 and/or any other parameter or key.

In some demonstrative embodiments, as shown in FIG. 6, the eNB 604, e.g., cellular manager 104 (FIG. 1), may generate and send to the LTE cellular modem 665 an initiation message ("Init WiFi") 614, for example, as part of an RRC message.

In some demonstrative embodiments, initiation message 614 may include an identifier of a WLAN AP 606, e.g., WLAN node 106 (FIG. 1), for example, a WLAN_AP SSID corresponding to WLAN AP 606, or any other identifier.

In some demonstrative embodiments, initiation message 614 may include key information, for example a nonce, or any other key information, which may be configured, for example, to be used for generating a pre-shared-key.

In some demonstrative embodiments, initiation message 614 may include an IP address of eNB 604, e.g., to be used for establishing an IP tunnel between eNB 604 and the UE.

In some demonstrative embodiments, initiation message 614 may be secured and/or protected, for example, by a cellular protection protocol, for example, LTE security, which may be applied to communications between eNB 604 and the UE.

In some demonstrative embodiments, as shown in FIG. 6, UE LTE modem 665 may receive and process initiation message 614. For example, UE LTE modem 665, e.g., cellular TRx 165 (FIG. 1), may send an initiation message 616 to an LTE connection manager 668 of the UE. For example, LTE connection manager 668 may be implemented by a controller, e.g., controller 145 (FIG. 1).

In some demonstrative embodiments, initiation message 616 may include the identifier of WLAN AP 606, e.g., the SSID of WLAN AP 606, and a connection index ("Con-n_Index").

In some demonstrative embodiments, as shown in FIG. 6, LTE connection manager 668 may receive and process initiation message 616. For example, LTE connection manager 668, e.g., controller 145 (FIG. 1), may send an initiation message 618 to a UE WLAN connection manager 669 of the UE. For example, UE WLAN connection manager 669 may be implemented by a WLAN controller of UE 102 and/or any other element of UE 102 (FIG. 1).

In some demonstrative embodiments, initiation message 616 may include the identifier of WLAN AP 606, e.g., the SSID of WLAN AP 606.

In some demonstrative embodiments, as shown in FIG. 6, UE WLAN connection manager 669 may receive and process initiation message 618. For example, UE WLAN connection manager 669 may send a WLAN connection instruction 620 to a WLAN NIC 663 of the UE, e.g., WLAN TRx 163 (FIG. 1) of UE 102 (FIG. 1).

In some demonstrative embodiments, WLAN connection instruction 620 may include the identifier of WLAN AP 606, e.g., the SSID of WLAN AP 606.

In some demonstrative embodiments, as shown in FIG. 6, WLAN NIC 663, e.g., WLAN TRx 163 (FIG. 1), may receive and process WLAN connection instruction 620. For example, WLAN NIC 663, e.g., WLAN TRx 163 (FIG. 1), may establish (622) a WLAN connection with WLAN AP 606, e.g., WLAN node 106 (FIG. 1), e.g., based on the identifier of WLAN AP 606.

In some demonstrative embodiments, as shown in FIG. 6, UE WLAN connection manager 669 send an IPSec initiation message ("Init_IPSec") 624 to an Operating System (OS) 667 of the UE, e.g., an OS of UE 102 (FIG. 1).

In some demonstrative embodiments, IPSec initiation message 624 may include the connection index, which was received in message 616.

In some demonstrative embodiments, as shown in FIG. 6, LTE modem 665, e.g., cellular TRx 165 (FIG. 1), may provide (626) to the UE OS 667 the key information and the eNB IP, e.g., as received in message 614. For example, LTE modem 665 and OS 667 may be configured to communicate the key information and the eNB IP in a secure manner.

In some demonstrative embodiments, as shown in FIG. 6, UE OS 667 and eNB 604 may be configured to perform operations (628) according to the IKEv2 protocol to establish (630) an IPSec secure session between UE OS 167 and eNB 604, for example, over an IP tunnel via WLAN AP 606.

In some demonstrative embodiments, as shown in FIG. 6, UE OS 667 and eNB 604 to perform the operations 628 of the IKEv2 protocol, for example, using a PSK, which is based at least on the key information, e.g., the nonce, sent from eNB 604 in message 614.

In some demonstrative embodiments, the PSK may be determined based on the key information and one or more of the shared parameters, e.g., KeNB 612 and/or any other shared parameters. In one example, the PSK may be determined based on the nonce and KeNB 612. In another example, the PSK may be determined based on the nonce and an address (WLAN NIC MAC address) of UE WiFi NIC 663. According to this example, the PSK may be bind to the WLAN NIC MAC address.

In some demonstrative embodiments, the PSK may be determined based only on the key information, e.g., without using KeNB 612 and/or any other shared parameters. For example, the PSK may include the nonce.

In some demonstrative embodiments, the nonce and/or any other key information used to generate the IKVv2 PSK, may be handled in a secure manner, for example, to prevent "hijacking" of the IPSec session by another UE. For example, the UE OS 667 may be configured to execute an IPSec client in a secure execution environment, and to use a secure session to the LTE modem 665.

In some demonstrative embodiments, as shown in FIG. 6, eNB 604 may transmit to the UE downlink packets 632, which may be protected by the IPSec, and UE OS 667 may decapsulate and decrypt from the packets 632 packets of downlink traffic 634, which may be provided to an application on the UE.

In some demonstrative embodiments, the WLAN connection 622 may be performed outside of the LTE security domain, e.g., by establishing a secure WiFi connection to WLAN AP 606.

In some demonstrative embodiments, WLAN AP 606 may be selected by an operator, e.g., of CN 189 (FIG. 1), which may be able to instruct the UE to connect to the selected WLAN AP 606, e.g., as described below.

In some demonstrative embodiments, WLAN link aggregation may be performed via any WLAN AP, e.g., a home network, a private network, a retail AP, and the like, to which the UE may already be connected. According to these embodiments, the UE may send the IP address of the WLAN AP IP the eNB.

Referring back to FIG. 1, in some demonstrative embodiments cellular manager 104 and/or UE 102 may be configured to utilize an eNB-Assisted private/public mechanism, which may enable cellular manager 104 and UE 102 to establish an IPSec session, for example, even without needing a certificate to start the mutual authentication step of the Ikv2 phase 1.

In some demonstrative embodiments, cellular manager 104 and UE 102 may be configured to utilize a public key and/or a private key to establish an authenticated IPSec tunnel including UE 102 and cellular node 104, e.g., between UE 102 and cellular node 104 or between UE 102 and a security gateway.

In some demonstrative embodiments, cellular node 104 may be configured to generate a public and/or private key for UE 102, e.g., to be used by the LTE modem of UE 102. According to these embodiments, cellular manager 104 may send the public and/or private key to UE 102 via a secure connection, e.g., a secure connection established by the LTE.

In some demonstrative embodiments, UE 102, e.g., the LTE modem of UE 102, may already have the public and/or private key. According to these embodiments, public keys may be exchanged between UE 102 and cellular manager 104, or the security gateway.

In some demonstrative embodiments, controller component 144 may be configured to trigger cellular transceiver 167 to transmit to UE 102 a cellular message including the WLAN identifier of WLAN node 106, a first public key corresponding to cellular manager 104 ("eNB public key"), a second public key corresponding to UE 102 ("UE public key"), a private key corresponding to UE 102 ("UE private key"), and an IP address of the cellular manager 104.

In some demonstrative embodiments, a mutual authentication between UE 102 and cellular manager 104 may be performed, for example, using the eNB public key, the UE public key, and the UE private key, for example, to allow establishing an IPSec session between UE 102 and cellular manager 104 via WLAN node 106, e.g., as described below.

In some demonstrative embodiments, cellular transceiver 165 may receive the cellular message from cellular node 104 including the WLAN identifier of WLAN node 106, the eNB public key, the UE public key, the UE private key, and the IP address of cellular node 104.

In some demonstrative embodiments, controller component 145 may be configured to trigger WLAN transceiver 163 to establish a WLAN connection with WLAN node 106, e.g., based on the WLAN identifier.

In some demonstrative embodiments, controller component 145 may be configured to trigger UE 102 to participate in a mutual authentication procedure with cellular node 104, for example, using the eNB public key, the UE public key, and the UE private key, and to establish the IPSec session, e.g., as described below.

Figure 7:
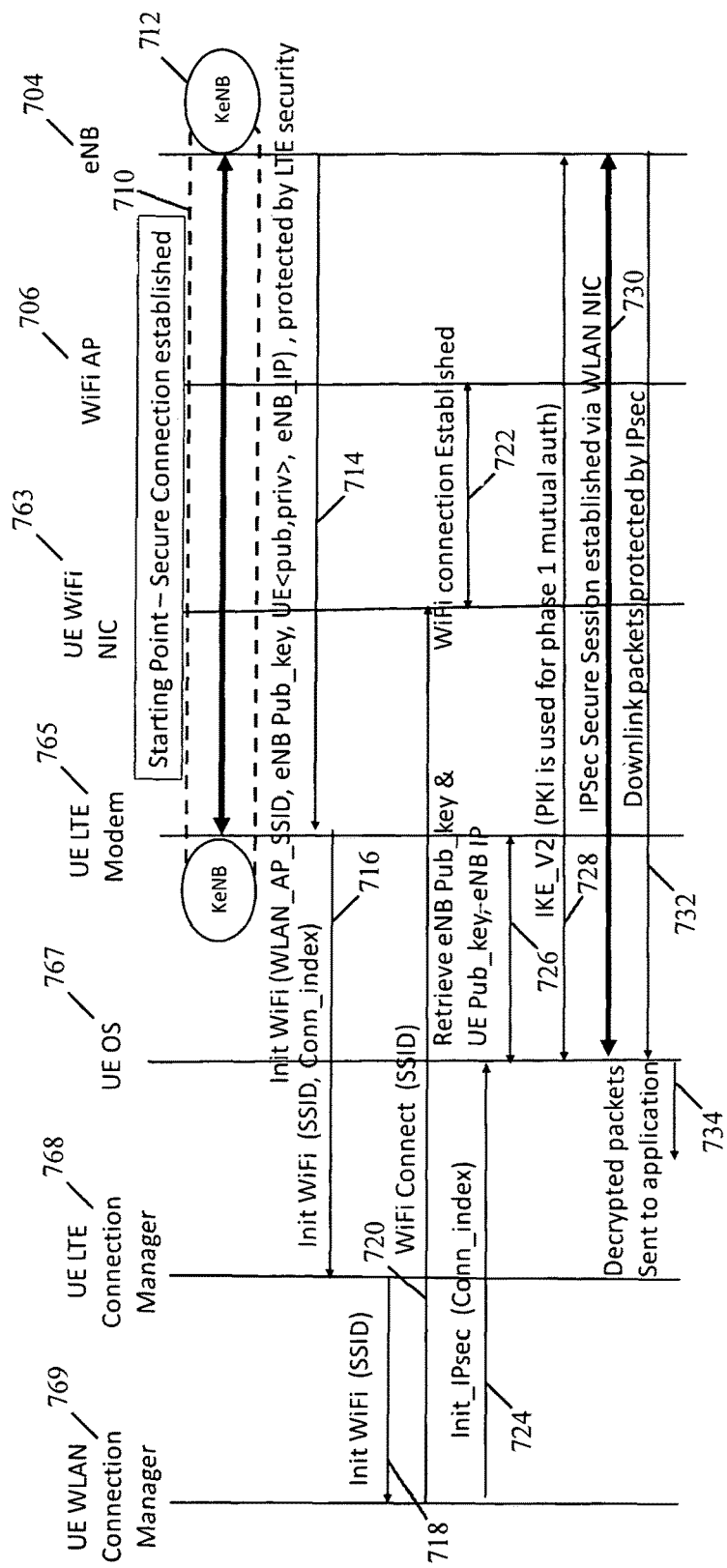
FIG. 7 is a schematic illustration of operations and communications of establishing a secure IP session, in accordance with some demonstrative embodiments.

Reference is made to FIG. 7, which schematically illustrates operations and communications of establishing a secure IP session, in accordance with some demonstrative embodiments.

In some demonstrative embodiments, as shown in FIG. 7, an eNB 704, e.g., cellular manager 104 (FIG. 1), may establish (710) a secure connection with a UE, for example, with an LTE cellular modem 765 of the UE, e.g., cellular TRx 165 (FIG. 1) of UE 102 (FIG. 1).

In some demonstrative embodiments, as shown in FIG. 7, the eNB 704 and LTE cellular modem 765 may both have information regarding one or more security parameters, which may be securely shared. For example, both the eNB 704, e.g., cellular manager 104 (FIG. 1), and the LTE cellular modem 765, e.g., cellular TRx 165 (FIG. 1), may have knowledge of an eNB Key (KeNB) 712 and/or any other parameter or key.

In some demonstrative embodiments, as shown in FIG. 7, the eNB 704, e.g., cellular manager 104 (FIG. 1), may generate and send to the LTE cellular modem 765 an initiation message ("Init WiFi") 714, for example, as part of an RRC message.

In some demonstrative embodiments, initiation message 714 may include an identifier of a WLAN AP 706, e.g., WLAN node 106 (FIG. 1), for example, a WLAN_AP SSID corresponding to WLAN AP 706, or any other identifier.

In some demonstrative embodiments, initiation message 714 may include an eNB public key assigned to eNB 704, a UE public key assigned to the UE, and a UE private key assigned to the UE.

In some demonstrative embodiments, eNB 704 may be configured to generate a pair of a private key and a public key ("<pub, pri>") for the UE, and to send the pair of keys to the LT modem of the UE.

In some demonstrative embodiments, the private key of eNB 704 may be maintained securely, e.g., may not leave the LTE modem of eNB 706.

In some demonstrative embodiments, initiation message 714 may include an IP address of eNB 704, e.g., to be used for establishing an IP tunnel between eNB 704 and the UE.

In some demonstrative embodiments, initiation message 714 may be secured and/or protected, for example, by a cellular protection protocol, for example, LTE security, which may be applied to communications between eNB 704 and the UE.

In some demonstrative embodiments, as: shown in FIG. 7, UE LTE modem 765 may receive and process initiation message 714. For example, UE LTE modem 765, e.g., cellular TRx 165 (FIG. 1), may send an initiation message 716 to an LTE connection manager 768 of the UE. For example, LTE connection manager 768 may be implemented by a controller, e.g., controller 145 (FIG. 1).

In some demonstrative embodiments, initiation message 716 may include the identifier of WLAN AP 706, e.g., the SSID of WLAN AP 706, and a connection index ("Conn_Index").

In some demonstrative embodiments, as shown in FIG. 7, LTE connection manager 768 may receive and process initiation message 716. For example, LTE connection manager 768, e.g., controller 145 (FIG. 1), may send an initiation message 718 to a UE WLAN connection manager 769 of the UE. For example, UE WLAN connection manager 769 may be implemented by a WLAN controller of UE 102 and/or any other element of UE 102 (FIG. 1).

In some demonstrative embodiments, initiation message 716 may include the identifier of WLAN AP 706, e.g., the SSID of WLAN AP 706.

In some demonstrative embodiments, as shown in FIG. 7, UE WLAN connection manager 769 may receive and process initiation message 718. For example, UE WLAN connection manager 769 may send a WLAN connection instruction 720 to a WLAN NIC 763 of the UE, e.g., WLAN TRx 163 (FIG. 1) of UE 102 (FIG. 1).

In some demonstrative embodiments, WLAN connection instruction 720 may include the identifier of WLAN AP 706, e.g., the SSID of WLAN AP 706.

In some demonstrative embodiments, as shown in FIG. 7, WLAN NIC 763, e.g., WLAN TRx 163 (FIG. 1), may receive and process WLAN connection instruction 720. For example, WLAN NIC 763, e.g., WLAN TRx 163 (FIG. 1), may establish (722) a WLAN connection with WLAN AP 706, e.g., WLAN node 106 (FIG. 1), e.g., based on the identifier of WLAN AP 706.

In some demonstrative embodiments, as shown in FIG. 7, UE WLAN connection manager 769 send an IPSec initiation message ("Init_IPSec") 724 to an Operating System (OS) 767 of the UE, e.g., an OS of UE 102 (FIG. 1).

In some demonstrative embodiments, IPSec initiation message 724 may include the connection index, which was received in message 716.

In some demonstrative embodiments, as shown in FIG. 7, LTE modem 765, e.g., cellular TRx 165 (FIG. 1), may provide (726) to the UE OS 767 the eNB public key, the UE the UE public key, and the eNB IP address, e.g., as received in message 714. For example, LTE modem 765 and OS 767 may be configured to communicate the eNB public key, the UE the UE public key, and the eNB IP address in a secure manner.

In some demonstrative embodiments, as shown in FIG. 7, UE OS 767 and eNB 704 may be configured to perform operations (728) according to the IKEv2 protocol to establish (730) an IPSec secure session between UE OS 167 and eNB 704, for example, over an IP tunnel via WLAN AP 706.

In some demonstrative embodiments, as shown in FIG. 7, UE OS 767 and eNB 704 to perform the operations 728 of the IKEv2 protocol, for example, using the private and public keys.

In some demonstrative embodiments, LTE modem 765 may act as a signer during the IKEv2 protocol exchange, for example, to prove the client identity. Alternatively, the eNB-generated public/private may be stored in a secure location on the UE.

In some demonstrative embodiments, as shown in FIG. 7, eNB 704 may transmit to the UE downlink packets 732, which may be protected by the IPSec, and UE OS 767 may decapsulate and decrypt from the packets 732 packets of downlink traffic 734, which may be provided to an application on the UE.

Referring back to FIG. 1, in some demonstrative embodiments cellular manager 104 and UE 102 may be configured to allow UE 102 to move from one WLAN node to another, for example, while maintaining the IP tunnel, e.g., as described below.

In some demonstrative embodiments, cellular manager 104 may be configured to indicate to UE 102 a list of one or more WLAN APs for which UE 102 may not be required to re-establish the IP tunnel, e.g., when moving between different WLAN APs.

In some demonstrative embodiments, the list of WLAN APs may include WLAN APs, which reside in the same IP subnet.

In some demonstrative embodiments, when UE 102 decides to roam from a first (source) WLAN AP to a second (target) WLAN AP belonging to the list of WLAN APs, UE 102 may optionally indicate to cellular manager 104, e.g., using an RRC message, to suspend transmission on the WLAN. The UE 102 may disassociate from the source WLAN AP, and may associate with the target WLAN AP. Upon associating with the target WLAN AP, the UE 102 may indicate to cellular manager 104, e.g., using an RRC message, to resume transmission on the WLAN, for example, if UE 102 previously indicated to UE 102 to suspend the transmission on the WLAN.

In some demonstrative embodiments, controller component 144 may be configured to trigger cellular transceiver 167 to transmit to UE 102 a message, e.g., an RRC message, including a list of a plurality of WLAN nodes belonging to a same IP subnet.

In some demonstrative embodiments, cellular transceiver 165 may receive the message including the list of WLAN nodes, and controller component 145 may be configured to trigger WLAN transceiver 163 to establish an IP tunnel via a first WLAN node of the plurality of WLAN nodes in the list, and to transfer the IP tunnel from the first WLAN node to a second WLAN node of the plurality of WLAN nodes in the list.

In some demonstrative embodiments, controller component 145 may be configured to trigger cellular transceiver 165 to transmit to cellular manager 104 an indication to suspend transmission via the IP tunnel; to trigger WLAN transceiver 163 to disassociate from the first WLAN node; to trigger the WLAN transceiver 163 to associate with the second WLAN node, and to trigger cellular transceiver 165 to transmit to cellular manager 104 an indication to resume communication over the IP tunnel.

In some demonstrative embodiments, controller component 144 may be configured to trigger WLAN node interface 169 to transfer the IP tunnel from the first WLAN node to the second WLAN node, for example, based on the indication from the UE.

In some demonstrative embodiments, UE 102 may not know whether the IP tunnel can be kept for the target WLAN AP, or the target WLAN AP may not be in the list of WLAN APs. According to these embodiments, UE 102 may, for example, tear down the IP tunnel, disassociate from the source WLAN AP, and perform an Aggregation Activation to establish a new IP session via the target WLAN AP, e.g., as described above.

In some demonstrative embodiments, cellular manager 104 and UE 102 may be configured to allow handing UE 102 over from cellular manager 104 to another cellular manager, e.g., another eNB.

In some demonstrative embodiments, upon handover, the IP tunnel may be torn down, for example, either by UE 102 or by cellular manager 104.

In some demonstrative embodiments, one or more handover procedures, e.g., in accordance with 3GPP handover procedures, may be utilized for an eNB handover.

In some demonstrative embodiments, for example, for an above PDCP implementation of the IP tunnel, there may potentially be a packet loss during the eNB handover process, for example, if successful reception of packets sent over the WLAN link cannot be tracked to enable the source eNB to route unsuccessful packets to the target eNB. In a below PDCP implementation, a combination of PDCP sequence numbers combined with a UE based PDCP status report, may be used to track un-acknowledged PDCP packets during handover.

In some demonstrative embodiments, a new RRC or in-band signaling, e.g., similar to a PDCP status report, may be defined, for example, to indicate which IP packets were successfully received at the UE 102, e.g., during the eNB handover. For example, a sequence number within the IP header field or within the IP payload may be introduced for such tracking.

In some demonstrative embodiments, the WLAN aggregation may be de-activated, for example, either by cellular manager 104 or by UE 102, for example, using explicit RRC signaling, or by tearing down the IP tunnel.

Figure 8:
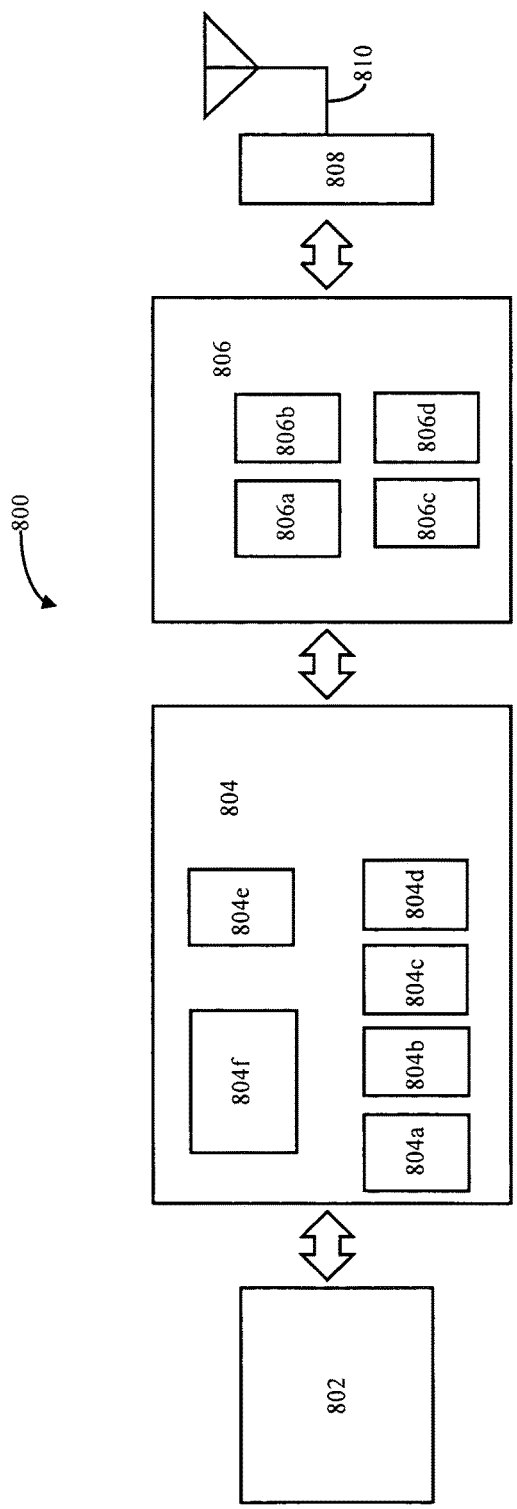
FIG. 8 is a schematic illustration of elements of a User Equipment (UE), in accordance with some demonstrative embodiments.

Reference is made to FIG. 8, which schematically illustrates elements of a UE device 800, in accordance with some demonstrative embodiments. For example, one or more elements of UE device 800 may perform the functionality of one or more elements of UE 102 (FIG. 1). In one example, one or more elements of UE device 800 may be configured to perform the functionality of one or more of cellular TRx 165 (FIG. 1), WLAN TRx 163 (FIG. 1), controller 145 (FIG. 1), message processor 182 (FIG. 1), and/or one or more other elements of UE 102 (FIG. 1). In some demonstrative embodiments, embodiments of a UE may be implemented into a system using any suitably configured hardware and/or software. FIG. 8 illustrates, for one embodiment, example components of UE device 800.

In some demonstrative embodiments, UE device 800 may include application circuitry 802, baseband circuitry 804, Radio Frequency (RF) circuitry 806, front-end module (FEM) circuitry 808, and one or more antennas 810, coupled together at least as shown.

In one example, application circuitry 802 may be configured to perform at least part of the functionality of controller 145 (FIG. 1), and/or message processor 182 (FIG. 1); and/or baseband circuitry 804, RF circuitry 806, and/or FEM circuitry 808 may be configured to perform at least part of the functionality of cellular TRx 165 (FIG. 1), WLAN TRx 163 (FIG. 1), controller 145 (FIG. 1), and/or message processor 182 (FIG. 1).

In some demonstrative embodiments, the application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

In some demonstrative embodiments, the baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802, for example, for generation and processing of the baseband signals and for controlling operations of the RF circuitry 806. For example, in some embodiments, the baseband circuitry 804 may include a second generation (2G) baseband processor 804*a*, a third generation (3G) baseband processor 804*b*, a fourth generation (4G) baseband processor 804*c*, and/or other baseband processor(s) 804*d* for other existing generations, generations in development or to be developed in the future (e.g., fifth generation (5G), 6G, etc.). The baseband circuitry 804 (e.g., one or more of baseband processors 804*a*-*d*) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some demonstrative embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured, for example, to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may be include elements for compression/decompression and echo cancellation, and/or may include other suitable processing elements in other embodiments. Components of the baseband circuitry 804 may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some demonstrative embodiments, the baseband circuitry 804 may provide for communication compatible with one or more radio technologies. For example, in some embodiments, the baseband circuitry 804 may, support communication with an evolved universal terrestrial radio access network (EUTRAN) and/or other wireless metropolitan area networks (WMAN), a wireless local area network (WLAN), a wireless personal area network (WPAN), and/or one or more additional or alternative networks. Embodiments in which the baseband circuitry 804 is configured to support radio communications of more than one wireless protocol may be referred to as multi-mode baseband circuitry.

In some demonstrative embodiments, RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808, and to (provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some demonstrative embodiments, the RF circuitry 806 may include a receive signal path and a transmit signal path. The receive signal path of the RF circuitry 806 may include mixer circuitry 806a, amplifier circuitry 806b, and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be, for example, a low-pass filter (LPF) or a band-pass filter (BPF), configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some demonstrative embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some demonstrative embodiments, the mixer circuitry 806a of the receive signal path and the mixer circuitry 806a of the transmit signal path may include two or more mixers and may be arranged for quadrature downconversion and/or upconversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and/or direct upconversion, respectively. In some embodiments, the mixer circuitry 806a of the receive signal path and the mixer circuitry 806a of the transmit signal path may be configured for super-heterodyne operation.

In some demonstrative embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry, and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some demonstrative embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

In some demonstrative embodiments, the synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some demonstrative embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

In some demonstrative embodiments, synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some demonstrative embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

In some demonstrative embodiments, FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some demonstrative embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

In some embodiments, the UE device 800 may include one or more additional or alternative elements such as, for example, memory/storage, display, camera, sensor, and/or input/output (I/O) interface.

Figure 9:
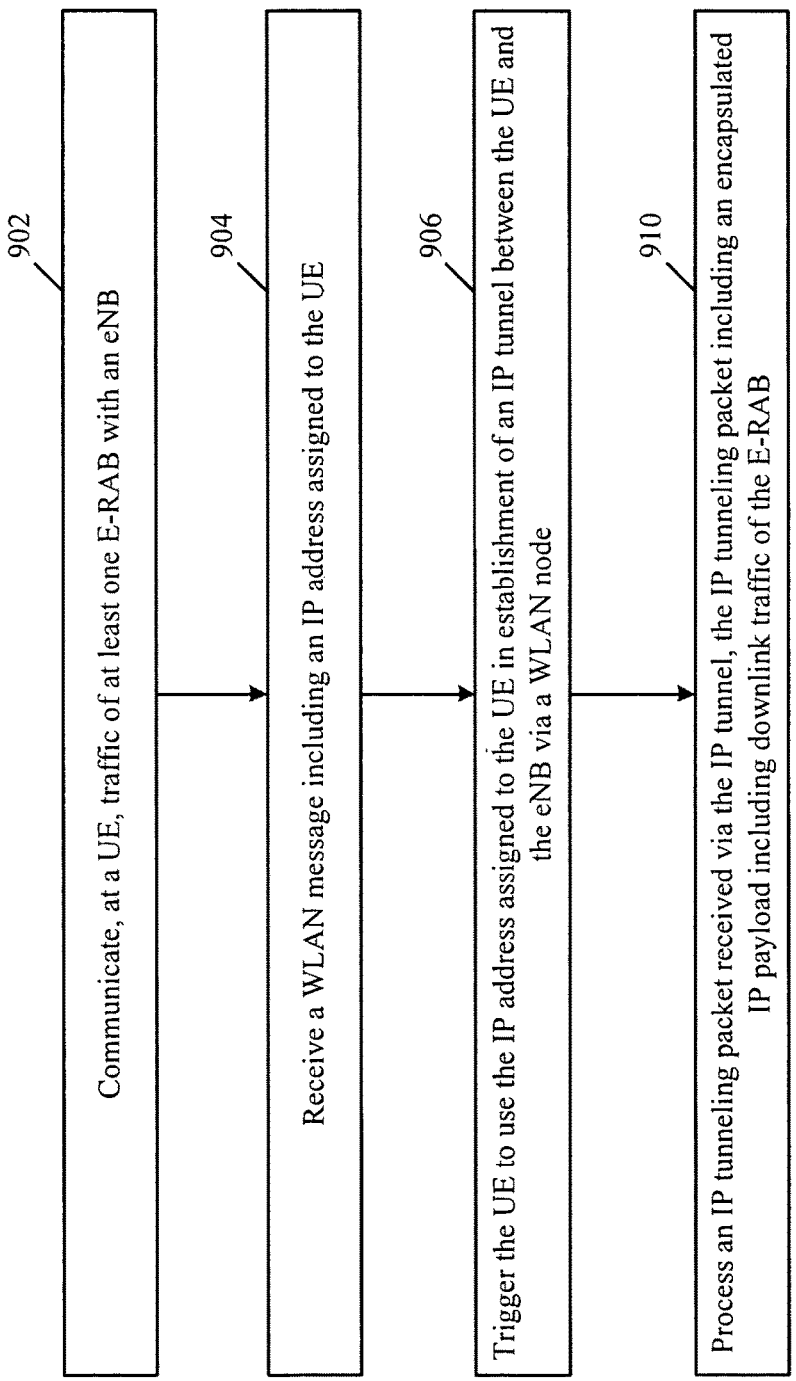
FIG. 9 is a schematic flow-chart illustration of a method of communicating between a cellular manager and UE via a WLAN node, in accordance with some demonstrative embodiments.

Reference is made to FIG. 9, which schematically illustrates a method of communicating between a cellular manager and UE via a WLAN node, in accordance with some demonstrative embodiments. In some embodiments, one or more of the operations of the method of FIG. 9 may be performed by a wireless communication system e.g., system 100 (FIG. 1); a cellular manager, e.g., cellular manager 104 (FIG. 1); a WLAN node, e.g., WLAN node 106 (FIG. 1); an interface, e.g., interface 169 (FIG. 1), and/or interface 192 (FIG. 1); a Transceiver, e.g., WLAN TRx 163 (FIG. 1), cellular TRx 165 (FIG. 1), WLAN radio 194 (FIG. 1), and/or cellular TRx 167 (FIG. 1); and/or a controller, e.g., controller 144 (FIG. 1), controller 149 (FIG. 1), and/or controller 145 (FIG. 1).

As indicated at block 902, the method may include communicating, at a UE, traffic of at least one E-RAB with an eNB. For example, controller component 145 (FIG. 1) may cause UE 102 (FIG. 1) to communicate traffic of, an E-RAB with cellular manager 104 (FIG. 1), e.g., as described above.

As indicated at block 904, the method may include receiving a WLAN message including an IP address assigned to the UE. For example, WLAN transceiver 163 (FIG. 1) may receive from the WLAN a WLAN message including the IP address assigned to UE 102 (FIG. 1), e.g., as described above.

As indicated at block 906, the method may include triggering the UE to use the IP address assigned to the UE in establishment of an IP tunnel between the UE and the eNB via a WLAN node. For example, controller component 145 (FIG. 1) may be configured to trigger UE 102 (FIG. 1) to use the IP address assigned to UE 102 (FIG. 1) in establishment of an IP tunnel between UE 102 (FIG. 1) and cellular manager 104 (FIG. 1) via WLAN node 106 (FIG. 1), e.g., as described above.

As indicated at block 908, the method may include processing an IP tunneling packet received via the IP tunnel, the IP tunneling packet including an encapsulated IP payload including downlink traffic of the E-RAB. For example, controller component 145 (FIG. 1) may trigger UE 102 (FIG. 1) to processing the IP tunneling packet received via the IP tunnel, e.g., as described above.

Figure 10:
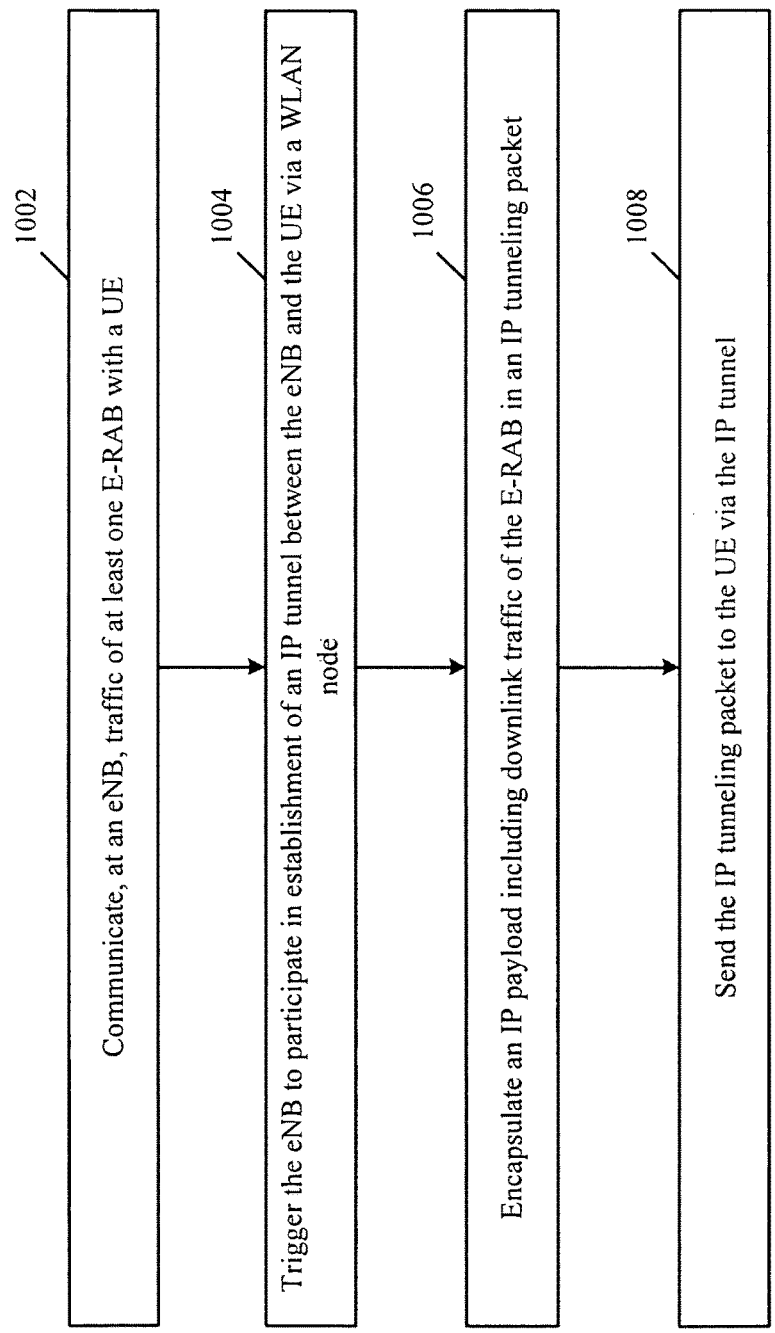
FIG. 10 is a schematic flow-chart illustration of a method of communicating between a cellular manager and a UE via a WLAN node, in accordance with some demonstrative embodiments.

Reference is made to FIG. 10, which schematically illustrates a method of communicating between a cellular manager and a UE via a WLAN node, in accordance with some demonstrative embodiments. In some embodiments, one or more of the operations of the method of FIG. 10 may be performed by a wireless communication system e.g., system 100 (FIG. 1); a cellular manager, e.g., cellular manager 104 (FIG. 1); a WLAN node, e.g., WLAN node 106 (FIG. 1); an interface, e.g., interface 169 (FIG. 1), and/or interface 192 (FIG. 1); a Transceiver, e.g., WLAN TRx 163 (FIG. 1), cellular TRx 165 (FIG. 1), WLAN radio 194 (FIG. 1), and/or cellular TRx 167 (FIG. 1); and/or a controller, e.g., controller 144 (FIG. 1), controller 149 (FIG. 1), and/or controller 145 (FIG. 1).

As indicated at block 1002, the method may include communicating, at an eNB, traffic of at least one E-RAB with ca UE. For example, controller component 144 (FIG. 1) may cause cellular manager 104 (FIG. 1) to communicate traffic of an E-RAB with UE 102 (FIG. 1), e.g., as described above.

As indicated at block 1004, the method may include triggering the eNB to participate in establishment of an IP tunnel between the eNB and the UE via a WLAN node. For example, controller component 144 (FIG. 1) may be configured to trigger cellular manager 104 (FIG. 1) to participate in establishment of an IP tunnel with UE 102 (FIG. 1) via WLAN node 106 (FIG. 1), e.g., as described above.

As indicated at block 1006, the method may include encapsulating an IP payload including downlink traffic of the E-RAB in an IP tunneling packet. For example, controller component 144 (FIG. 1) may be configured to trigger cellular manager 104 (FIG. 1) to encapsulate an IP payload including downlink traffic of the E-RAB in an IP tunneling packet, e.g., as described above.

As indicated at block 1008, the method may include sending the IP tunneling packet to the UE via the IP tunnel. For example, controller component 144 (FIG. 1) may be configured to trigger cellular TRx 167 (FIG. 1) to send the IP tunneling packet to UE 102 (FIG. 1) via the IP tunnel, e.g., as described above.

Figure 11:
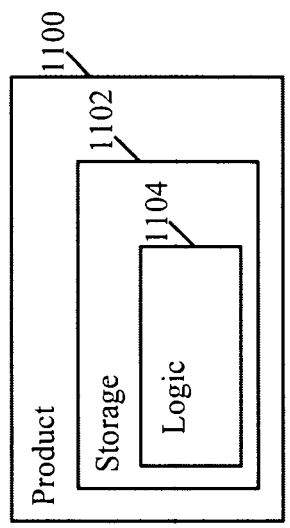
FIG. 11 is a schematic illustration of a product, in accordance with some demonstrative embodiments.

Reference is made to FIG. 11, which schematically illustrates a product of manufacture 300, in accordance with some demonstrative embodiments. Product 1100 may include one or more tangible computer-readable, non-transitory storage media 1102, which may include computer-executable instructions, e.g., implemented by logic 1104, operable to, when executed by at least one computer processor, enable the at least one computer processor to implement one or more operations at a cellular manager, e.g., cellular manager 104 (FIG. 1); a WLAN node, e.g., WLAN node 106 (FIG. 1); an interface, e.g., interface 169 (FIG. 1), and/or interface 192 (FIG. 1); a Transceiver, e.g., WLAN TRx 163 (FIG. 1), cellular TRx 165 (FIG. 1), WLAN radio 194 (FIG. 1), and/or cellular TRx 167 (FIG. 1); and/or a controller, e.g., controller 144 (FIG. 1), controller 149 (FIG. 1), and/or controller 145 (FIG. 1); to perform, trigger and/or implement one or more operations and/or functionalities of FIG. 9 and/or FIG. 10; and/or to perform one or more operations described herein. The phrase "non-transitory machine-readable medium" is directed to include all computer-readable media, with the sole exception being a transitory propagating signal.

In some demonstrative embodiments, product 1100 and/or machine-readable storage medium 1102 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined, computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of a User Equipment (UE), the apparatus comprising a cellular transceiver to communicate with an Evolved Node B (eNB) traffic of at least one Evolved Universal Mobile Telecommunications System (UMTS) Terrestrial Radio Access Network (E-UTRAN) Radio Access Bearer (E-RAB); a Wireless Local Area Network (WLAN) transceiver to receive a WLAN message comprising an Internet Protocol (IP) address assigned to the UE; and a controller component configured to trigger the UE to use the IP address assigned to the UE in establishment of an IP tunnel with the eNB via a WLAN node, and to process an IP tunneling packet received via the IP tunnel, the IP tunneling packet comprising an encapsulated IP payload comprising downlink traffic of the E-RAB.

Example 2 includes the subject matter of Example 1, and optionally, wherein the IP tunnel comprises an IP security (IPSec) tunnel; the IP tunneling packet is encrypted and authenticated according to an IPSec protocol.

Example 3 includes the subject matter of Example 2, and optionally, wherein the cellular transceiver is to receive from the eNB a cellular message comprising a WLAN identifier of the WLAN node, key information, and an IP address of the eNB, the controller component configured to trigger the WLAN transceiver to establish a WLAN connection with the WLAN node based on the WLAN identifier, to trigger the UE to perform a mutual authentication between the UE and the eNB using the key information, and to establish an IPSec session with the eNB via the WLAN connection.

Example 4 includes the subject matter of Example 3, and optionally, wherein the key information comprises a nonce.

Example 5 includes the subject matter of Example 3, and optionally, wherein the controller component is configured to determine a pre-shared key, based on the key information in the cellular message, and to trigger the UE to perform the mutual authentication between the UE and the eNB using the pre-shared key.

Example 6 includes the subject matter of Example 2, and optionally, wherein the cellular transceiver is to receive from the eNB a cellular message comprising a WLAN identifier of the WLAN node, an eNB public key, a UE public key, a UE private key, and an IP address of the eNB, the controller component configured to trigger the WLAN transceiver to establish a WLAN connection with the WLAN node based on the WLAN identifier, to trigger the UE to perform a mutual authentication between the UE and the eNB using the eNB public key, the UE public key and the UE private key, and to establish an IPSec session with the eNB via the WLAN connection.

Example 7 includes the subject matter of Example 1, and optionally, wherein the IP tunnel comprises a non-secure tunnel between the UE and the eNB.

Example 8 includes the subject matter of Example 7, and optionally, wherein the cellular transceiver is to receive from the eNB a cellular message comprising key information, the controller component is configured to generate a WLAN pre-shared key based at least on the key information, and to trigger the WLAN transceiver to establish a secure session with the WLAN node using the WLAN pre-shared key.

Example 9 includes the subject matter of Example 8, and optionally, wherein the controller component is configured to trigger the cellular transceiver to transmit to the eNB a response message comprising a WLAN identifier of the WLAN transceiver, in response to an aggregation initiation message received from the eNB, the cellular transceiver to receive the cellular message from the eNB after transmission of the response message.

Example 10 includes the subject matter of any one of Examples 1-9, and optionally, wherein the cellular transceiver is to receive from the eNB a list of a plurality of WLAN nodes belonging to a same IP subnet, the controller component is configured to trigger the WLAN transceiver to establish the IP tunnel via a first WLAN node of the plurality of WLAN nodes, and to transfer the IP tunnel from the first WLAN node to a second WLAN node of the plurality of WLAN nodes.

Example 11 includes the subject matter of Example 10, and optionally, wherein the controller component is configured to trigger the cellular transceiver to transmit to the eNB an indication to suspend transmission via the IP tunnel, to trigger the WLAN transceiver to disassociate from the first WLAN node, to trigger the WLAN transceiver to associate with the second WLAN node, and to trigger the cellular transceiver to transmit to the eNB an indication to resume communication over the IP tunnel.

Example 12 includes the subject matter of any one of Examples 1-9, and optionally, comprising one or more antennas, a memory and a processor.

Example 13 includes an apparatus comprising circuitry and logic configured to trigger a User Equipment (UE) to communicate with an Evolved Node B (eNB) traffic of at least one Evolved Universal Mobile Telecommunications System (UMTS) Terrestrial Radio Access Network (E-UTRAN) Radio Access Bearer (E-RAB); receive a Wireless Local Area Network (WLAN) message comprising an Internet Protocol (IP) address assigned to the UE; trigger the UE to use the IP address assigned to the UE in establishment of an IP tunnel with the eNB via a WLAN node; and process an IP tunneling packet received via the IP tunnel, the IP tunneling packet comprising an encapsulated IP payload comprising downlink traffic of the E-RAB.

Example 14 includes the subject matter of Example 13, and optionally, wherein the IP tunnel comprises an IP security (IPSec) tunnel, the IP tunneling packet is encrypted and authenticated according to an IPSec protocol.

Example 15 includes the subject matter of Example 14, and optionally, wherein the apparatus is configured to cause the UE to receive from the eNB a cellular message comprising a WLAN identifier of the WLAN node, key information, and an IP address of the eNB; to establish a WLAN connection with the WLAN node based on the WLAN identifier; to perform a mutual authentication between the UE and the eNB using the key information; and to establish an IPSec session with the eNB via the WLAN connection.

Example 16 includes the subject matter of Example IS, and optionally, wherein the key information comprises a nonce.

Example 17 includes the subject matter of Example 15, and optionally, wherein the apparatus is configured to cause the UE to determine a pre-shared key, based on the key information in the cellular message, and to perform the mutual authentication between the UE and the eNB using the pre-shared key.

Example 18 includes the subject matter of Example 14, and optionally, wherein the apparatus is configured to cause the UE to receive from the eNB a cellular message comprising a WLAN identifier of the WLAN node, an eNB public key, a UE public key, a UE private key, and an IP address of the eNB; to establish a WLAN connection with the WLAN node based on the WLAN identifier; to perform a mutual authentication between the UE and the eNB using the eNB public key, the UE public key and the UE private key; and to establish an IPSec session with the eNB via the WLAN connection.

Example 19 includes the subject matter of Example 13, and optionally, wherein the IP tunnel comprises a non-secure tunnel between the UE and the eNB.

Example 20 includes the subject matter of Example 19, and optionally, wherein the apparatus is configured to cause the UE to receive from the eNB a cellular message comprising key information, to generate a WLAN pre-shared key based at least on the key information, and to establish a secure session with the WLAN node using the WLAN pre-shared key.

Example 21 includes the subject matter of Example 20, and optionally, wherein the apparatus is configured to cause the UE to transmit to the eNB a response message comprising a WLAN identifier of the UE, in response to an aggregation initiation message received from the eNB, and to receive the cellular message from the eNB after transmission of the response message.

Example 22 includes the subject matter of any one of Examples 13-21, and optionally, wherein the apparatus is configured to, cause the UE to receive from the eNB a list of a plurality of WLAN nodes belonging to a same IP subnet, to establish the IP tunnel via a first WLAN node of the plurality of WLAN nodes, and to transfer the IP tunnel from the first WLAN node to a second WLAN node of the plurality of WLAN nodes.

Example 23 includes the subject matter of Example 22, and optionally, wherein the apparatus is configured to cause the UE to transmit to the eNB an indication to suspend transmission via the IP tunnel, to disassociate from the first WLAN node, to associate with the second WLAN node, and to transmit to the eNB an indication to resume communication over the IP tunnel.

Example 24 includes the subject matter of any one of Examples 13-21, and optionally, comprising one or more antennas, a memory and a processor.

Example 25 includes a system of cellular communication comprising a User Equipment (UE), the UE comprising a cellular transceiver to communicate with an Evolved Node B (eNB) traffic of at least one Evolved Universal Mobile Telecommunications System (UMTS) Terrestrial Radio Access Network (E-UTRAN) Radio Access Bearer (E-RAB); a Wireless Local Area Network (WLAN) transceiver to receive a WLAN message comprising an Internet Protocol (IP) address assigned to the UE; and a controller component configured to trigger the UE to use the IP address assigned to the UE in establishment of an IP tunnel with the eNB via a WLAN node, and to process an IP tunneling packet received via the IP tunnel, the IP tunneling packet comprising an encapsulated IP payload comprising downlink traffic of the E-RAB.

Example 26 includes the subject matter of Example 25, and optionally, wherein the IP tunnel comprises an IP security (IPSec) tunnel, the IP tunneling packet is encrypted and authenticated according to an IPSec protocol.

Example 27 includes the subject matter of Example 26, and optionally, wherein the cellular transceiver is to receive from the eNB a cellular message comprising a WLAN identifier of the WLAN node, key information, and an IP address of the eNB, the controller component configured to trigger the WLAN transceiver to establish a WLAN connection with the WLAN node based on the WLAN identifier, to trigger the UE to perform a mutual authentication between the UE and the eNB using the key information, and to establish an IPSec session with the eNB via the WLAN connection.

Example 28 includes the subject matter of Example 27, and optionally, wherein the key information comprises a nonce.

Example 29 includes the subject matter of Example 27, and optionally, wherein the controller component is configured to determine a pre-shared key, based on the key information in the cellular message, and to trigger the UE to perform the mutual authentication between the UE and the eNB using the pre-shared key.

Example 30 includes the subject matter of Example 26, and optionally, wherein the cellular transceiver is to receive from the eNB a cellular message comprising a WLAN identifier of the WLAN node, an eNB public key, a UE public key, a UE private key, and an IP address of the eNB, the controller component configured to trigger the WLAN transceiver to establish a WLAN connection with the WLAN node based on the WLAN identifier, to trigger the UE to perform a mutual authentication between the UE and the eNB using the eNB public key, the UE public key and the UE private key, and to establish an IPSec session with the eNB via the WLAN connection.

Example 31 includes the subject matter of Example 25, and optionally, wherein the IP tunnel comprises a non-secure tunnel between the UE and the eNB.

Example 32 includes the subject matter of Example 31, and optionally, wherein the cellular transceiver is to receive from the eNB a cellular message comprising key information, the controller component is configured to generate a WLAN pre-shared key based at least on the key information, and to trigger the WLAN transceiver to establish a secure session with the WLAN node using the WLAN pre-shared key.

Example 33 includes the subject matter of Example 32, and optionally, wherein the controller component is configured to trigger the cellular transceiver to transmit to the eNB a response message comprising a WLAN identifier of the WLAN transceiver, in response to an aggregation initiation message received from the eNB, the cellular transceiver to receive the cellular message from the eNB after transmission of the response message.

Example 34 includes the subject matter of any one of Examples 25-33, and optionally, wherein the cellular transceiver is to receive from the eNB a list of a plurality of WLAN nodes belonging to a same IP subnet, the controller component is configured to trigger the WLAN transceiver to establish the IP tunnel via a first WLAN node of the plurality of WLAN nodes, and to transfer the IP tunnel from the first WLAN node to a second WLAN node of the plurality of WLAN nodes.

Example 35 includes the subject matter of Example 34, and optionally, wherein the controller component is configured to trigger the cellular transceiver to transmit to the eNB an indication to suspend transmission via the IP tunnel, to trigger the WLAN transceiver to disassociate from the first WLAN node, to trigger the WLAN transceiver to associate with the second WLAN node, and to trigger the cellular transceiver to transmit to the eNB an indication to resume communication over the IP tunnel.

Example 36 includes the subject matter of any one of Examples 25-33, and optionally, wherein the UE comprises one or more antennas, a memory and a processor.

Example 37 includes a method to be performed by a User Equipment (UE), the method comprising communicating with an Evolved Node B (eNB) traffic of at least one Evolved Universal Mobile Telecommunications System (UMTS) Terrestrial Radio Access Network (E-UTRAN) Radio Access Bearer (E-RAB); receiving a Wireless Local Area Network (WLAN) message comprising an Internet Protocol (IP) address assigned to the UE; triggering the UE to use the IP address assigned, to the UE in establishment of an IP tunnel with the eNB via a WLAN node; and processing an IP tunneling packet received via the IP tunnel, the IP tunneling packet comprising an encapsulated IP payload comprising downlink traffic of the E-RAB.

Example 38 includes the subject matter of Example 37, and optionally, wherein the IP tunnel comprises an IP security (IPSec) tunnel, the IP tunneling packet is encrypted and authenticated according to an IPSec protocol.

Example 39 includes the subject matter of Example 38, and optionally, comprising receiving from the eNB a cellular message comprising a WLAN identifier of the WLAN node, key information, and an IP address of the eNB; triggering the UE to establish a WLAN connection with the WLAN node based on the WLAN identifier; triggering the UE to perform a mutual authentication between the UE and the eNB using the key information; and establishing an IPSec session with the eNB via the WLAN connection.

Example 40 includes the subject matter of Example 39, and optionally, wherein the key information comprises a nonce.

Example 41 includes the subject matter of Example 39, and optionally, comprising determining a pre-shared key, based on the key information in the cellular message, and triggering the UE to perform the mutual authentication between the UE and the eNB using the pre-shared key.

Example 42 includes the subject matter of Example 38, and optionally, comprising receiving from the eNB a cellular message comprising a WLAN identifier of the WLAN node, an eNB public key, a UE public key, a UE private key, and an IP address of the eNB; triggering the UE to establish a WLAN connection with the WLAN node based on the WLAN identifier; triggering the UE to perform a mutual authentication between the UE and the eNB using the eNB public key, the UE public key and the UE private key; and establishing an IPSec session with the eNB via the WLAN connection.

Example 43 includes the subject matter of Example 37, and optionally, wherein the IP tunnel comprises a non-secure tunnel between the UE and the eNB.

Example 44 includes the subject matter of Example 43, and optionally, comprising receiving from the eNB a cellular message comprising key information, generating a WLAN pre-shared key based at least on the key information, and triggering the UE to establish a secure session with the WLAN node using the WLAN pre-shared key.

Example 45 includes the subject matter of Example 44, and optionally, comprising triggering the UE to transmit to the eNB a response message comprising a WLAN identifier of the UE, in response to an aggregation initiation message received from the eNB; and receiving the cellular message from the eNB after transmission of the response message.

Example 46 includes the subject matter of any one of Examples 37-45, and optionally, comprising receiving from the eNB a list of a plurality of WLAN nodes belonging to a same IP subnet; triggering the UE to establish the IP tunnel via a first WLAN node of the plurality of WLAN nodes; and transferring the IP tunnel from the first WLAN node to a second WLAN node of the plurality of WLAN nodes.

Example 47 includes the subject matter of Example 46, and optionally, comprising triggering the UE to transmit to the eNB an indication to suspend transmission via the IP tunnel; triggering the UE to disassociate from the first WLAN node; triggering the UE to associate with the second WLAN node; and triggering the UE to transmit to the eNB an indication to resume communication over the IP tunnel.

Example 48 includes a product comprising one or more tangible computer-readable storage media comprising computer-executable instructions operable to, when executed by at least one computer processor, enable the at least One computer processor to implement one or more operations at a User Equipment (UE), the (operations comprising communicating with an Evolved Node B (eNB) traffic of at least one Evolved Universal Mobile Telecommunications System (UMTS) Terrestrial Radio Access Network (E-UTRAN) Radio Access Bearer (E-RAB); receiving a Wireless Local Area Network (WLAN) message comprising an Internet Protocol (IP) address assigned to the UE; triggering the UE to use the IP address assigned to the UE in establishment of an IP tunnel with the eNB via a WLAN node; and processing an IP tunneling packet received via the IP tunnel, the IP tunneling packet comprising an encapsulated IP payload comprising downlink traffic of the E-RAB.

Example 49 includes the subject matter of Example 48, and optionally, wherein the IP tunnel comprises an IP security (IPSec) tunnel, the IP tunneling packet is encrypted and authenticated according to an IPSec protocol.

Example 50 includes the subject matter of Example 49, and optionally, wherein the operations comprise receiving from the eNB a cellular message comprising a WLAN identifier of the WLAN node, key information, and an IP address of the eNB; triggering the UE to establish a WLAN connection with the WLAN node based on the WLAN identifier; triggering the UE to perform a mutual authentication between the UE and the eNB using the key information; and establishing an IPSec session with the eNB via the WLAN connection.

Example 51 includes the subject matter of Example 50, and optionally, wherein the key information comprises a nonce.

Example 52 includes the subject matter of Example 50, and optionally, wherein the operations comprise determining a pre-shared key, based on the key information in the cellular message, and triggering the UE to perform the mutual authentication between the UE and the eNB using the pre-shared key.

Example 53 includes the subject matter of Example 50, and optionally, wherein the operations comprise receiving from the eNB a cellular message comprising a WLAN identifier of the WLAN node, an eNB public key, a UE public key, a UE private key, and an IP address of the eNB; triggering the UE to establish a WLAN connection with the WLAN node based on the WLAN identifier; triggering the UE to perform a mutual authentication between the UE and the eNB using the eNB public key, the UE public key and the UE private key; and establishing an IPSec session with the eNB via the WLAN connection.

Example 54 includes the subject matter of Example 49, and optionally, wherein the IP tunnel comprises a non-secure tunnel between the UE and the eNB.

Example 55 includes the subject matter of Example 54, and optionally, wherein the operations comprise receiving from the eNB a cellular message comprising key information, generating a WLAN pre-shared key based at least on the key information, and triggering the UE to establish a secure session with the WLAN node using the WLAN pre-shared key.

Example 56 includes the subject matter of Example 55, and optionally, wherein the operations comprise triggering the UE to transmit to the eNB a response message comprising a WLAN identifier of the UE, in response to an aggregation initiation message received from the eNB, and receiving the cellular message from the eNB after transmission of the response message.

Example 57 includes the subject matter of any one of Examples 49-56, and optionally, wherein the operations comprise receiving from the eNB a list of a plurality of WLAN nodes belonging to a same IP subnet; triggering the UE to establish the IP tunnel via a first WLAN node of the plurality of WLAN nodes; and transferring the IP tunnel from the first WLAN node to a second WLAN node of the plurality of WLAN nodes.

Example 58 includes the subject matter of Example 57, and optionally, wherein the operations comprise triggering the UE to transmit to the eNB an indication to suspend transmission via the IP tunnel; triggering the UE to disassociate from the first WLAN node; triggering the UE to associate with the second WLAN node; and triggering the UE to transmit to the eNB an indication to resume communication over the IP tunnel.

Example 59 includes an apparatus of a User Equipment (UE), the apparatus comprising means for communicating with an Evolved Node B (eNB) traffic of at least one Evolved Universal Mobile Telecommunications System (UMTS) Terrestrial Radio Access Network (E-UTRAN) Radio Access Bearer (E-RAB); means for receiving a Wireless Local Area Network (WLAN) message comprising an Internet Protocol (IP) address assigned to the UE; means for triggering the UE to use the IP address assigned to the UE in establishment of an IP tunnel with the eNB via a WLAN node; and means for processing an IP tunneling packet received via the IP tunnel, the IP tunneling packet comprising an encapsulated IP payload comprising downlink traffic of the E-RAB.

Example 60 includes the subject matter of Example 59, and optionally, wherein the IP tunnel comprises an IP security (IPSec) tunnel, the IP tunneling packet is encrypted and authenticated according to an IPSec protocol.

Example 61 includes the subject matter of Example 60, and optionally, comprising means for receiving from the eNB a cellular message comprising a WLAN identifier of the WLAN node, key information, and an IP address of the eNB, and means for triggering the UE to establish a WLAN connection with the WLAN node based on the WLAN identifier, triggering the UE to perform a mutual authentication between the UE and the eNB using the key information, and establishing an IPSec session with the eNB via the WLAN connection.

Example 62 includes the subject matter of Example 61, and optionally, wherein the key information comprises a nonce.

Example 63 includes the subject matter of Example 61, and optionally, comprising means for determining a pre-shared key, based on the key information in the cellular message, and triggering the UE to perform the mutual authentication between the UE and the eNB using the pre-shared key.

Example 64 includes the subject matter: of Example 60, and optionally, comprising means for receiving from the eNB a cellular message comprising a WLAN identifier of the WLAN node, an eNB public key, a UE public key, a UE private key, and an IP address of the eNB, and means for triggering the UE to establish a WLAN connection with the WLAN node based on the WLAN identifier, triggering the UE to perform a mutual authentication between the UE and the eNB using the eNB public key, the UE public key and the UE private key, and establishing an IPSec session with the eNB via the WLAN connection.

Example 65 includes the subject matter of Example 59, and optionally, wherein the IP tunnel comprises a non-secure tunnel between the UE and the eNB.

Example 66 includes the subject matter of Example 65, and optionally, comprising means for receiving from the eNB a cellular message comprising key information, and means for generating a WLAN pre-shared key based at least on the key information, and triggering the UE to establish a secure session with the WLAN node using the WLAN pre-shared key.

Example 67 includes the subject matter, of Example 66, and optionally, comprising means for triggering the UE to transmit to the eNB a response message comprising a WLAN identifier of the UE, in response to an aggregation initiation message received from the eNB, and means for receiving the cellular message from the eNB after transmission of the response message.

Example 68 includes the subject matter of any one of Examples 59-67, and optionally, comprising means for receiving from the eNB a list of a plurality of WLAN nodes belonging to a same IP subnet, and means for triggering the UE to establish the IP tunnel via a first WLAN node of the plurality of WLAN nodes, and transferring the IP tunnel from the first WLAN node to a second WLAN node of the plurality of WLAN nodes.

Example 69 includes the subject matter of Example 68, and optionally, comprising means for triggering the UE to transmit to the eNB an indication to suspend transmission via the IP tunnel, triggering the UE to disassociate from the first WLAN node, triggering the WLAN UE to associate with the second WLAN node, and triggering the UE to transmit to the eNB an indication to resume communication over the IP tunnel.

Example 70 includes an apparatus of an Evolved Node B (eNB), the apparatus comprising a cellular transceiver to communicate with a User Equipment (UE) traffic of at least one Evolved Universal Mobile Telecommunications System (UMTS) Terrestrial Radio Access Network (E-UTRAN) Radio Access Bearer (E-RAB); a Wireless Local Area Network (WLAN) node interface to communicate with a WLAN node; and a controller component configured to trigger the eNB to participate in establishment of an Internet Protocol (IP) tunnel with the UE via the WLAN node, to encapsulate an IP payload comprising downlink traffic of the E-RAB in an IP tunneling packet, and to send the IP tunneling packet to the UE via the IP tunnel.

Example 71 includes the subject matter of Example 70, and optionally, wherein the IP tunnel comprises an IP security (IPSec) tunnel, the IP tunneling packet is encrypted and authenticated according to an IPSec protocol.

Example 72 includes the subject matter of Example 71, and optionally, wherein the controller component is configured to trigger the cellular transceiver to transmit to the UE a cellular message comprising a WLAN identifier of the WLAN node, key information, and an IP address of the eNB, the controller component configured to trigger the eNB to perform a mutual authentication between the UE and the eNB using the key information, and to establish an IPSec session with the UE via the WLAN node.

Example 73 includes the subject matter of Example 72, and optionally, wherein the key information comprises a nonce.

Example 74 includes the subject matter of Example 72, and optionally, wherein the controller component is configured to determine a pre-shared key based at least on the key information in the cellular message, and to trigger the eNB to perform the mutual authentication between the UE and the eNB using the pre-shared key.

Example 75 includes the subject matter of Example 71, and optionally, wherein the controller component is configured to trigger the cellular transceiver to transmit to the UE a cellular message comprising a WLAN identifier of the WLAN node, an eNB public key, a UE public key, a UE private key, and an IP address of the eNB, the controller component configured to trigger the eNB to perform a mutual authentication between the UE and the eNB using the eNB public key, the UE public key and the UE private key, and to establish an IPSec session with the UE via the WLAN node.

Example 76 includes the subject matter of Example 70, and optionally, wherein the IP tunnel comprises a non-secure tunnel between the UE and the eNB.

Example 77 includes the subject matter of Example 76, and optionally, wherein the controller component is configured to generate key information, to determine a WLAN shared key based at least on the key information, to trigger the WLAN node interface to send to the WLAN node the WLAN shared key, and to trigger the cellular transceiver to transmit to the UE a cellular message comprising the key information.

Example 78 includes the subject matter of Example 77, and optionally, wherein the controller component is configured to trigger the cellular transceiver to transmit to the UE an aggregation initiation message comprising a WLAN identifier of the WLAN node, to process a response message from the UE comprising a WLAN identifier of the UE, to trigger the WLAN node interface to send to the WLAN node an access request comprising the WLAN identifier of the UE, and, upon receipt of an acknowledgement message from the WLAN node, to trigger the cellular transceiver to transmit to the UE a connection request message comprising the key information.

Example 79 includes the subject matter of any one of Examples 70-78, and optionally, wherein the controller component is configured to trigger the cellular transceiver to transmit to the UE a list of a plurality of WLAN nodes belonging to a same IP subnet, the controller component configured to trigger the WLAN node interface to transfer the IP tunnel from a first WLAN node to a second WLAN node of the plurality of WLAN nodes, based on an indication from the UE.

Example 80 includes the subject matter of any one of Examples 70-78, and optionally, comprising one or more antennas, a memory and a processor.

Example 81 includes an apparatus comprising circuitry and logic configured to trigger an Evolved Node B (eNB) to communicate with a User Equipment (UE) traffic of at least one Evolved Universal Mobile Telecommunications System (UMTS) Terrestrial Radio Access Network (E-UTRAN) Radio Access Bearer (E-RAB); trigger the eNB to participate in establishment of an IP tunnel with the UE via a Wireless Local Area Network (WLAN) node; encapsulate an IP payload comprising downlink traffic of the E-RAB in an IP tunneling packet; and send the IP tunneling packet to the UE via the IP tunnel.

Example 82 includes the subject matter of Example 81, and optionally, wherein the IP tunnel comprises an IP security (IPSec) tunnel, the IP tunneling packet is encrypted and authenticated according to an IPSec protocol.

Example 83 includes the subject matter of Example 82, and optionally, wherein the apparatus is configured to trigger the eNB to transmit to the UE a cellular message comprising a WLAN identifier of the WLAN node, key information, and an IP address of the eNB; to trigger the eNB to perform a mutual authentication between the UE and the eNB using the key information; and to establish an IPSec session with the UE via the WLAN node.

Example 84 includes the subject matter of Example 83, and optionally, wherein the key information comprises a nonce.

Example 85 includes the subject matter of Example 83, and optionally, wherein the apparatus is configured to determine a pre-shared key based at least on the key information in the cellular message, and to trigger the eNB to perform the mutual authentication between the UE and the eNB using the pre-shared key.

Example 86 includes the subject matter of Example 82, and optionally, wherein the apparatus is configured to trigger the eNB to transmit to the UE a cellular message comprising a WLAN identifier of the WLAN node, an eNB public key, a UE public key, a UE private key, and an IP address of the eNB; to trigger the eNB to perform a mutual authentication between the UE and the eNB using the eNB public key, the UE public key and the UE private key; and to establish an IPSec session with the UE via the WLAN node.

Example 87 includes the subject matter of Example 81, and optionally, wherein the IP tunnel comprises a non-secure tunnel between the UE and the eNB.

Example 88 includes the subject matter of Example 87, and optionally, wherein the apparatus is configured to generate key information, to determine a WLAN shared key based at least on the key information, to trigger the eNB to send to the WLAN node the WLAN shared key, and to trigger the eNB to transmit to the UE a cellular message comprising the key information.

Example 89 includes the subject matter of Example 88, and optionally, wherein the apparatus is configured to trigger the eNB to transmit to the UE an aggregation initiation message comprising a WLAN identifier of the WLAN node; to process a response message from the UE comprising a WLAN identifier of, the UE; to trigger the eNB to send to the WLAN node an access request comprising the WLAN identifier of the UE; and, upon receipt of an acknowledgement message from the WLAN node, to trigger the eNB to transmit to the UE a connection request message comprising the key information.

Example 90 includes the subject matter of any one of Examples 81-89, and optionally, wherein the apparatus is configured to trigger the eNB to transmit to the UE a list of a plurality of WLAN nodes belonging to a same IP subnet; and to trigger the eNB to transfer the IP tunnel from a first WLAN node to a second WLAN node of the plurality of WLAN nodes, based on an indication from the UE.

Example 91 includes the subject matter of any one of Examples 81-89, and optionally, comprising one or more antennas, a memory and a processor.

Example 92 includes a system of cellular communication comprising an Evolved Node B (eNB), the eNB comprising a cellular transceiver to communicate with a User Equipment (UE) traffic of at least one Evolved Universal Mobile Telecommunications System (UMTS) Terrestrial Radio Access Network (E-UTRAN) Radio Access Bearer (E-RAB); a Wireless Local Area Network (WLAN) node interface to communicate with a WLAN node; and a controller component configured to trigger the eNB to participate in establishment of an Internet Protocol (IP) tunnel with the UE via the WLAN node, to encapsulate an IP payload comprising downlink traffic of the E-RAB in an IP tunneling packet, and to send the IP tunneling packet to the UE via the IP tunnel.

Example 93 includes the subject matter of Example 92, and optionally, wherein the IP tunnel comprises an IP security (IPSec) tunnel, the IP tunneling packet is encrypted and authenticated according to an IPSec protocol.

Example 94 includes the subject matter of Example 93, and optionally, wherein the controller component is configured to trigger the cellular transceiver to transmit to the UE a cellular message comprising a WLAN identifier of the WLAN node, key information, and an IP address of the eNB, the controller component configured to trigger the eNB to perform a mutual authentication between the UE and the eNB using the key information, and to establish an IPSec session with the UE via the WLAN node.

Example 95 includes the subject matter of Example 94, and optionally, wherein the key information comprises a nonce.

Example 96 includes the subject matter of Example 94, and optionally, wherein the controller component is configured to determine a pre-shared key based at least on the key information in the cellular message, and to trigger the eNB to perform the mutual authentication between the UE and the eNB using the pre-shared key.

Example 97 includes the subject matter of Example 93, and optionally, wherein the controller component is configured to trigger the cellular transceiver to transmit to the UE a cellular message comprising a WLAN identifier of the WLAN node, an eNB public key, a UE public key, a UE private key, and an IP address of the eNB, the controller component configured to trigger the eNB to perform a mutual authentication between the UE and the eNB using the eNB public key, the UE public key and the UE private key, and to establish an IPSec session with the UE via the WLAN node.

Example 98 includes the subject matter of Example 92, and optionally, wherein the IP tunnel comprises a non-secure tunnel between the UE and the eNB.

Example 99 includes the subject matter of Example 98, and optionally, wherein the controller component is configured to generate key information, to determine a WLAN shared key based at least on the key information, to trigger the WLAN node interface to send to the WLAN node the WLAN shared key, and to trigger the cellular transceiver to transmit to the UE a cellular message comprising the key information.

Example 100 includes the subject matter of Example 99, and optionally, wherein the controller component is configured to trigger the cellular transceiver to transmit to the UE an aggregation initiation message comprising a WLAN identifier of the WLAN node, to process a response message from the UE comprising a WLAN identifier of the UE, to trigger the WLAN node interface to send to the WLAN node an access request comprising the WLAN identifier of the UE, and, upon receipt of an acknowledgement message from the WLAN node, to trigger the cellular transceiver to transmit to the UE a connection request message comprising the key information.

Example 101 includes the subject matter of any one of Examples 92-100, and optionally, wherein the controller component is configured to trigger the cellular transceiver to transmit to the UE a list of a plurality of WLAN nodes belonging to a same IP subnet, the controller component configured to trigger the WLAN node interface to transfer the IP tunnel from a first WLAN node to a second WLAN node of the plurality of WLAN nodes, based on an indication from the UE.

Example 102 includes the subject matter of any one of Examples 92-100, and optionally, wherein the eNB comprises one or more antennas, a memory and a processor.

Example 103 includes a method to be performed at an Evolved Node B (eNB), the method comprising communicating with a Usr Equipment (UE) traffic of at least one Evolved Universal Mobile Telecommunications System (UMTS) Terrestrial Radio Access Network (E-UTRAN) Radio Access Bearer (E-RAB); triggering the eNB to participate in establishment of an Internet Protocol (IP) tunnel with the UE via a Wireless Local Area Network (WLAN) node; encapsulating an IP payload comprising downlink traffic of the E-RAB in an IP tunneling packet; and sending the IP tunneling packet to the UE via the IP tunnel.

Example 104 includes the subject matter of Example 103, and optionally, wherein the IP tunnel comprises an IP security (IPSec) tunnel, the IP tunneling packet is encrypted and authenticated according to an IPSec protocol.

Example 105 includes the subject matter of Example 104, and optionally, comprising triggering the eNB to transmit to the UE a cellular message comprising a WLAN identifier of the WLAN node, key information, and an IP address of the eNB; triggering the eNB to perform a mutual authentication between the UE and the eNB using the key information; and establishing an IPSec session with the UE via the WLAN node.

Example 106 includes the subject matter of Example 105, and optionally, wherein the key information comprises a nonce.

Example 107 includes the subject matter of Example 105, and optionally, comprising determining a pre-shared key based at least on the key information in the cellular message, and triggering the eNB to perform the mutual authentication between the UE and the eNB using the pre-shared key.

Example 108 includes the subject matter of Example 104, and optionally, comprising triggering the eNB to transmit to the UE a cellular message comprising a WLAN identifier of the WLAN node, an eNB public key, a UE public key, a UE private key, and an IP address of the eNB; triggering the eNB to perform a mutual authentication between the UE and the eNB using the eNB public key, the UE public key and the UE private key; and establishing an IPSec session with the UE via the WLAN node.

Example 109 includes the subject matter of Example 103, and optionally, wherein the IP tunnel comprises a non-secure tunnel between the UE and the eNB.

Example 110 includes the subject matter of Example 109, and optionally, comprising generating key information; determining a WLAN shared key based at least on the key information; triggering the eNB to send to the WLAN node the WLAN shared key; and triggering the eNB to transmit to the UE a cellular message comprising the key information.

Example 111 includes the subject matter of Example 110, and optionally, comprising triggering the eNB to transmit to the UE an aggregation initiation message comprising a WLAN identifier of the WLAN node; processing a response message from the UE comprising a WLAN identifier of the UE; triggering the eNB to send to the WLAN node an access request comprising the WLAN identifier of the UE; and, upon receipt of an acknowledgement message from the WLAN node, triggering the eNB to transmit to the UE a connection request message comprising the key information.

Example 112 includes the subject matter of any one of Examples 103-111, and optionally, comprising triggering the eNB to transmit to the UE a list of a plurality of WLAN nodes belonging to a same IP subnet, triggering the eNB to transfer the IP tunnel from a first WLAN node to a second WLAN node of the plurality of WLAN nodes, based on an indication from the UE.

Example 113 includes a product comprising one or more tangible computer-readable storage media comprising computer-executable instructions operable to, when executed by at least one computer processor, enable the at least one computer processor to implement one or more operations at an Evolved Node B (eNB), the operations comprising communicating with a User Equipment (UE) traffic of at least one Evolved Universal Mobile Telecommunications System (UMTS) Terrestrial Radio Access Network (E-UTRAN) Radio Access Bearer (E-RAB); triggering the eNB to participate in establishment of an Internet Protocol (IP) tunnel with the UE via a Wireless Local Area Network (WLAN) node; encapsulating an IP payload comprising downlink traffic of the E-RAB in an IP tunneling packet; and sending the IP tunneling packet to the UE via the IP tunnel.

Example 114 includes the subject matter of Example 113, and optionally, wherein the IP tunnel comprises an IP security (IPSec) tunnel, the IP tunneling packet is encrypted and authenticated according to an IPSec protocol:

Example 115 includes the subject matter of Example 114, and optionally, wherein the operations comprise triggering the eNB to transmit to the UE a cellular message comprising a WLAN identifier of the WLAN node, key information, and an IP address of the eNB; triggering the eNB to perform a mutual authentication between the UE and the eNB using the key information; and establishing an IPSec session with the UE via the WLAN node.

Example 116 includes the subject matter of Example 115, and optionally, wherein the key information comprises a nonce.

Example 117 includes the subject matter of Example 115, and optionally, wherein the operations comprise determining a pre-shared key based at least on the key information in the cellular message, and triggering the eNB to perform the mutual authentication between the UE and the eNB using the pre-shared key.

Example 118 includes the subject matter of Example 114, and optionally, wherein the operations comprise triggering the eNB to transmit to the UE a cellular message comprising a WLAN identifier of the WLAN node, an eNB public key, a UE public key, a UE private key, and an IP address of the eNB; triggering the eNB to perform a mutual authentication between the UE and the eNB using the eNB public key, the UE public key and the UE private key; and establishing an IPSec session with the UE via the WLAN node.

Example 119 includes the subject matter of Example 113, and optionally, wherein the IP tunnel comprises a non-secure tunnel between the UE and the eNB.

Example 120 includes the subject matter of Example 119, and optionally, wherein the operations comprise generating key information; determining a WLAN shared key based at least on the key information; triggering the eNB to send to the WLAN node the WLAN shared key; and triggering the eNB to transmit to the UE a cellular message comprising the key information.

Example 121 includes the subject matter of Example 120, and optionally, wherein the operations comprise triggering the eNB to transmit to the UE an aggregation initiation message comprising a WLAN identifier of the WLAN node; processing a response message from the UE comprising a WLAN identifier of the UE; triggering the eNB to send to the WLAN node an access request comprising the WLAN identifier of the UE; and, upon receipt of an acknowledgement message from the WLAN node, triggering the eNB to transmit to the UE a connection request message comprising the key information.

Example 122 includes the subject matter of any one of Examples 113-121, and optionally, wherein the operations comprise triggering the eNB to transmit to the UE a list of a plurality of WLAN nodes belonging to a same IP subnet; and triggering the eNB to transfer the IP tunnel from a first WLAN node to a second WLAN node of the plurality of WLAN nodes, based on an indication from the UE.

Example 123 includes an apparatus of an Evolved Node B (eNB), the apparatus comprising means for communicating with a User Equipment (UE) traffic of at least one Evolved Universal Mobile Telecommunications System (UMTS) Terrestrial Radio Access Network (E-UTRAN) Radio Access Bearer (E-RAB); means for triggering the eNB to participate in establishment of an Internet Protocol (IP) tunnel with the UE via a Wireless Local Area Network (WLAN) node; means for encapsulating an IP payload comprising downlink traffic of the E-RAB in an IP tunneling packet; and means for sending the IP tunneling packet to the UE via the IP tunnel.

Example 124 includes the subject matter of Example 123, and optionally, wherein the IP tunnel comprises an IP security (IPSec) tunnel, the IP tunneling packet is encrypted and authenticated according to an IPSec protocol.

Example 125 includes the subject matter of Example 124, and optionally, comprising means for triggering the eNB to transmit to the UE a cellular message comprising a WLAN identifier of the WLAN node, key information, and an IP address of the eNB; triggering the eNB to perform a mutual authentication between the UE and the eNB using the key information; and establishing an IPSec session with the UE via the WLAN node.

Example 126 includes the subject matter of Example 125, and optionally, wherein the key information comprises a nonce.

Example 127 includes the subject matter of Example 125, and optionally, comprising means for determining a pre-shared key based at least on the key information in the cellular message, and triggering the eNB to perform the mutual authentication between the UE and the eNB using the pre-shared key.

Example 128 includes the subject matter of Example 124, and optionally, comprising means for triggering the eNB to transmit to the UE a cellular message comprising a WLAN identifier of the WLAN node, an eNB public key, a UE public key, a UE private key, and an IP address of the eNB; triggering the eNB to perform a mutual authentication between the UE and the eNB using the eNB public key, the UE public key and the UE private key; and establishing an IPSec session with the UE via the WLAN node.

Example 129 includes the subject matter of Example 123, and optionally, wherein the IP tunnel comprises a non-secure tunnel between the UE and the eNB.

Example 130 includes the subject matter of Example 129, and optionally, comprising means for generating key information, determining a WLAN shared key based at least on the key information; triggering the eNB to send to the WLAN node the WLAN shared key; and triggering the eNB to transmit to the UE a cellular message comprising the key information.

Example 131 includes the subject matter of Example 130, and optionally, comprising means for triggering the eNB to transmit to the UE an aggregation initiation message comprising a WLAN identifier of the WLAN node; processing a response message from the UE comprising a WLAN identifier of the UE; triggering the eNB to send to the WLAN node an access request comprising the WLAN identifier of the UE; and, upon receipt of an acknowledgement message from the WLAN node, triggering the eNB to transmit to the UE a connection request message comprising the key information.

Example 132 includes the subject matter of any one of Examples 123-131, and optionally, comprising means for triggering the eNB to transmit to the UE a list of a plurality of WLAN nodes belonging to a same IP subnet; and triggering the eNB to transfer the IP tunnel from a first WLAN node to a second WLAN node of the plurality of WLAN nodes, based on an indication from the UE.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of a User Equipment (UE), the apparatus comprising:
   a cellular transceiver to communicate with an Evolved Node B (eNB) traffic of at least one Evolved Universal Mobile Telecommunications System (UMTS) Terrestrial Radio Access Network (E-UTRAN) Radio Access Bearer (E-RAB);
   a Wireless Local Area Network (WLAN) transceiver to receive a WLAN message comprising an Internet Protocol (IP) address assigned to the UE; and
   a controller component configured to trigger the UE to use the IP address assigned to the UE in establishment of an IP tunnel with the eNB via a WLAN node, and to process an IP tunneling packet received via the IP tunnel, the IP tunneling packet comprising an encapsulated IP payload comprising downlink traffic of the E-RAB.

2. The apparatus of claim 1, wherein the IP tunnel comprises an IP security (IPSec) tunnel, said IP tunneling packet is encrypted and authenticated according to an IPSec protocol.

3. The apparatus of claim 2, wherein the cellular transceiver is to receive from the eNB a cellular message comprising a WLAN identifier of the WLAN node, key information, and an IP address of the eNB, the controller component configured to trigger the WLAN transceiver to establish a WLAN connection with the WLAN node based on the WLAN identifier, to trigger the UE to perform a mutual authentication between the UE and the eNB using the key information, and to establish an IPSec session with the eNB via the WLAN connection.

4. The apparatus of claim 3, wherein the key information comprises a nonce.

5. The apparatus of claim 3, wherein the controller component is configured to determine a pre-shared key, based on the key information in the cellular message, and to trigger the UE to perform the mutual authentication between the UE and the eNB using the pre-shared key.

6. The apparatus of claim 2, wherein the cellular transceiver is to receive from the eNB a cellular message comprising a WLAN identifier of the WLAN node, an eNB public key, a UE public key, a UE private key, and an IP address of the eNB, the controller component configured to trigger the WLAN transceiver to establish a WLAN connection with the WLAN node based on the WLAN identifier, to trigger the UE to perform a mutual authentication between the UE and the eNB using the eNB public key, the UE public key and the UE private key, and to establish an IPSec session with the eNB via the WLAN connection.

7. The apparatus of claim 1, wherein the IP tunnel comprises a non-secure tunnel between the UE and the eNB.

8. The apparatus of claim 7, wherein the cellular transceiver is to receive from the eNB a cellular message comprising key information, said controller component is configured to generate a WLAN pre-shared key based at least on the key information, and to trigger the WLAN transceiver to establish a secure session with the WLAN node using the WLAN pre-shared key.

9. The apparatus of claim 8, wherein the controller component is configured to trigger the cellular transceiver to transmit to the eNB a response message comprising a WLAN identifier of the WLAN transceiver, in response to an aggregation initiation message received from the eNB, said cellular transceiver to receive the cellular message from the eNB after transmission of the response message.

10. The apparatus of claim 1, wherein the cellular transceiver is to receive from the eNB a list of a plurality of WLAN nodes belonging to a same IP subnet, the controller component is configured to trigger the WLAN transceiver to establish the IP tunnel via a first WLAN node of the plurality of WLAN nodes, and to transfer the IP tunnel from the first WLAN node to a second WLAN node of the plurality of WLAN nodes.

11. The apparatus of claim 10, wherein the controller component is configured to trigger the cellular transceiver to transmit to the eNB an indication to suspend transmission via the IP tunnel, to trigger the WLAN transceiver to disassociate from the first WLAN node, to trigger the WLAN transceiver to associate with the second WLAN node, and to trigger the cellular transceiver to transmit to the eNB an indication to resume communication over the IP tunnel.

12. The apparatus of claim 1 comprising one or more antennas, a memory and a processor.

13. A product comprising one or more tangible computer-readable non-transitory storage media comprising computer-executable instructions operable to, when executed by at least one computer processor, enable the at least one computer processor to implement one or more operations at a User Equipment (UE), the operations comprising:
communicating with an Evolved Node B (eNB) traffic of at least one Evolved Universal Mobile Telecommunications System (UMTS) Terrestrial Radio Access Network (E-UTRAN) Radio Access Bearer (E-RAB);
receiving a Wireless Local Area Network (WLAN) message comprising an Internet Protocol (IP) address assigned to the UE;
triggering the UE to use the IP address assigned to the UE in establishment of an IP tunnel with the eNB via a WLAN node; and
processing an IP tunneling packet received via the IP tunnel, the IP tunneling packet comprising an encapsulated IP payload comprising downlink traffic of the E-RAB.

14. The product of claim 13, wherein the IP tunnel comprises an IP security (IPSec) tunnel, said IP tunneling packet is encrypted and authenticated according to an IPSec protocol.

15. The product of claim 14, wherein the operations comprise receiving from the eNB a cellular message comprising a WLAN identifier of the WLAN node, key information, and an IP address of the eNB; triggering the UE to establish a WLAN connection with the WLAN node based on the WLAN identifier; triggering the UE to perform a mutual authentication between the UE and the eNB using the key information; and establishing an IPSec session with the eNB via the WLAN connection.

16. An apparatus of an Evolved Node B (eNB), the apparatus comprising:
a cellular transceiver to communicate with a User Equipment (UE) traffic of at least one Evolved Universal Mobile Telecommunications System (UMTS) Terrestrial Radio Access Network (E-UTRAN) Radio Access Bearer (E-RAB);
a Wireless Local Area Network (WLAN) node interface to communicate with a WLAN node; and
a controller component configured to trigger the eNB to participate in establishment of an Internet Protocol (IP) tunnel with the UE via the WLAN node, to encapsulate an IP payload comprising downlink traffic of the E-RAB in an IP tunneling packet, and to send the IP tunneling packet to the UE via the IP tunnel.

17. The apparatus of claim 16, wherein the IP tunnel comprises an IP security (IPSec) tunnel, said IP tunneling packet is encrypted and authenticated according to an IPSec protocol.

18. The apparatus of claim 17, wherein the controller component is configured to trigger the cellular transceiver to transmit to the UE a cellular message comprising a WLAN identifier of the WLAN node, key information, and an IP address of the eNB, the controller component configured to trigger the eNB to perform a mutual authentication between the UE and the eNB using the key information, and to establish an IPSec session with the UE via the WLAN node.

19. The apparatus of claim 18, wherein the controller component is configured to determine a pre-shared key based at least on the key information in the cellular message, and to trigger the eNB to perform the mutual authentication between the UE and the eNB using the pre-shared key.

20. The apparatus of claim 17, wherein the controller component is configured to trigger the cellular transceiver to transmit to the UE a cellular message comprising a WLAN identifier of the WLAN node, an eNB public key, a UE public key, a UE private key, and an IP address of the eNB, the controller component configured to trigger the eNB to perform a mutual authentication between the UE and the eNB using the eNB public key, the UE public key and the UE private key, and to establish an IPSec session with the UE via the WLAN node.

21. The apparatus of claim 16, wherein the IP tunnel comprises a non-secure tunnel between the UE and the eNB.

22. The apparatus of claim 21, wherein the controller component is configured to generate key information, to determine a WLAN shared key based at least on the key information, to trigger the WLAN node interface to send to the WLAN node the WLAN shared key, and to trigger the cellular transceiver to transmit to the UE a cellular message comprising the key information.

23. The apparatus of claim 22, wherein the controller component is configured to trigger the cellular transceiver to transmit to the UE an aggregation initiation message comprising a WLAN identifier of the WLAN node, to process a response message from the UE comprising a WLAN identifier of the UE, to trigger the WLAN node interface to send to the WLAN node an access request comprising the WLAN identifier of the UE, and, upon receipt of an acknowledgement message from the WLAN node, to trigger the cellular transceiver to transmit to the UE a connection request message comprising the key information.

24. The apparatus of claim 16, wherein the controller component is configured to trigger the cellular transceiver to transmit to the UE a list of a plurality of WLAN nodes belonging to a same IP subnet, the controller component configured to trigger the WLAN node interface to transfer the IP tunnel from a first WLAN node to a second WLAN node of the plurality of WLAN nodes, based on an indication from the UE.

25. The apparatus of claim 16 comprising one or more antennas, a memory and a processor.

* * * * *